US011823672B2

(12) United States Patent
Tajima

(10) Patent No.: US 11,823,672 B2
(45) Date of Patent: Nov. 21, 2023

(54) VOICE-OPERATED SYSTEM, CONTROLLER, COMPUTER-READABLE RECORDING MEDIUM, AND PROCESSING DEVICE

(71) Applicant: KONICA MINOLTA, INC., Tokyo (JP)

(72) Inventor: Hiroki Tajima, Itami (JP)

(73) Assignee: Konica Minolta, Inc., Tokyo (JP)

( * ) Notice: Subject to any disclaimer, the term of this patent is extended or adjusted under 35 U.S.C. 154(b) by 81 days.

(21) Appl. No.: 16/919,703

(22) Filed: Jul. 2, 2020

(65) Prior Publication Data

US 2021/0012771 A1 Jan. 14, 2021

(30) Foreign Application Priority Data

Jul. 8, 2019 (JP) .................................. 2019-126854

(51) Int. Cl.
*G10L 17/22* (2013.01)
*G06F 3/14* (2006.01)
(Continued)

(52) U.S. Cl.
CPC .............. *G10L 15/22* (2013.01); *G06F 3/167* (2013.01); *G10L 15/08* (2013.01); *G10L 17/24* (2013.01);
(Continued)

(58) Field of Classification Search
USPC ................... 379/88.01–88.12; 358/1.1–3.29, 358/1.11–1.18; 704/1–275;
(Continued)

(56) References Cited

U.S. PATENT DOCUMENTS 10,424,298 B2 * 9/2019 Fuchiwaki .............. G06F 3/167
11,394,838 B2 * 7/2022 Tsujii .................. H04N 1/00403
(Continued)

FOREIGN PATENT DOCUMENTS

| JP | 2010224890 A | 10/2010 |
| JP | 2013-153301 A | 8/2013 |
| JP | 5343652 | 8/2013 |

OTHER PUBLICATIONS

JP-2014222513, Didier Rene Guzzoni; Intelligent Automated Assistant; Nov. 27, 2014 (Year: 2014).*
(Continued)

*Primary Examiner* — Marcellus J Augustin
(74) *Attorney, Agent, or Firm* — BUCHANAN INGERSOLL & ROONEY PC

(57) ABSTRACT

A voice-operated system includes a processing device, and a controller that communicates with the processing device. The processing device includes a first processor to perform: displaying, on an operating panel, an operation screen for instructing a process for execution by the processing device, to receive user's instruction; and executing a process corresponding to a command received from the controller. The controller includes a second processor to perform: generating the command for the processing device based on an input voice; and transmitting the command to the processing device. The generation of the command includes, when the voice instructs the processing device to execute a first process, generating a first command for instructing the operating panel to display the operation screen for instructing execution of the first process; and when the voice instructs the processing device to execute a second process, generating a second command for instructing execution of the second process.

16 Claims, 31 Drawing Sheets

(51) Int. Cl.
 *G10L 15/00* (2013.01)
 *G10L 15/22* (2006.01)
 *G06F 3/16* (2006.01)
 *G10L 15/08* (2006.01)
 *G10L 17/24* (2013.01)

(52) U.S. Cl.
 CPC .. *G10L 2015/088* (2013.01); *G10L 2015/223* (2013.01); *G10L 2015/227* (2013.01)

(58) Field of Classification Search
 USPC .................................. 715/727–747, 818–825
 See application file for complete search history.

(56) References Cited

U.S. PATENT DOCUMENTS

| | | | | |
|---|---|---|---|---|
| 2004/0006479 | A1* | 1/2004 | Tanaka | G10L 15/22 704/E15.04 |
| 2011/0063215 | A1* | 3/2011 | Mishima | G06F 3/0482 345/157 |
| 2011/0066435 | A1* | 3/2011 | Tomono | G10L 15/26 348/E7.083 |
| 2011/0071829 | A1* | 3/2011 | Itoh | G10L 15/26 704/E15.001 |
| 2015/0317109 | A1 | 11/2015 | Kirihata | |
| 2016/0034253 | A1* | 2/2016 | Bang | H04M 1/724 715/728 |
| 2016/0142566 | A1* | 5/2016 | Nakajima | H04N 1/00411 358/1.15 |
| 2019/0155551 | A1* | 5/2019 | Fukumoto | G06F 3/1231 |
| 2020/0028979 | A1* | 1/2020 | Yamaguchi | H04N 1/00403 |
| 2021/0203793 | A1* | 7/2021 | Okamoto | G06F 3/1234 |

OTHER PUBLICATIONS

Maruyama M, Image Processing System E.g. Multi-functional Peripheral (MFP), Has Setting Unit That Sets Different Word For Audio Input From Another Image Processing Apparatus To Operation Screen; Jun. 30, 2019 (Year: 2019).*

Extended European Search Report dated Dec. 1, 2020, issued by the European Patent Office in corresponding European Application No. 20184723.3 (11 pages).

First Office Action issued in corresponding Chinese Patent Application No. 202010646822.2, dated Feb. 17, 2022 (20 pages).

Notice of Reasons for Refusal issued in Japanese Patent Application No. 2019-126854, dated Apr. 18, 2023, with English Translation (6 pages).

Notice of Reasons for Refusal issued in Japanese Patent Application No. 2019-126854, dated Sep. 19, 2023, with English Translation (4 pages).

* cited by examiner

FIG.6

| INSTRUCTION KEYWORD | SCREEN ID | SCREEN ID OF HIGHER-LEVEL SCREEN |
|---|---|---|
| 2-UP COPYING | 12112 | 10000,12000,12100 |
| TWO-SIDED COPYING | 12123 | 10000,12000,12100 |
| COLOR COPYING | 12125 | 10000,12000,12100 |
| SETTING FOR COPY DOCUMENT | 12127 | 10000,12000,12100 |
| COPYING AND STAPLING | 12128 | 10000,12000,12100 |
| COPYING | 12100 | 10000,12000 |
| TWO-SIDED SCANNING | 15123 | 10000,15000,15100 |
| COLOR SCANNING | 15125 | 10000,15000,15100 |
| SETTING FOR SCANNING DOCUMENT | 15127 | 10000,15000,15100 |
| SCANNING | 15100 | 10000,15000 |
| ... | ... | ... |

FIG.7

| INSTRUCTION KEYWORD | EXECUTION COMMAND |
|---|---|
| 2-UP COPYING | AAA |
| TWO-SIDED COPYING | BBB |
| ONE-SIDED COPYING | CCC |
| ... | ... |

FIG.20

| INSTRUCTION KEYWORD | EXECUTION COMMAND | SCREEN HIERARCHY LEVEL |
|---|---|---|
| 2-UP COPYING | AAA | 4 |
| TWO-SIDED COPYING | BBB | 3 |
| ONE-SIDED COPYING | CCC | 3 |
| COPY DENSITY | DDD | 6 |
| TWO-SIDED SCANNING | EEE | 3 |
| ... | ... | ... |

FIG.22

| INSTRUCTION KEYWORD | EXECUTION COMMAND | NUMBER OF EXECUTIONS |
|---|---|---|
| 2-UP COPYING | AAA | 15 |
| TWO-SIDED COPYING | BBB | 20 |
| ONE-SIDED COPYING | CCC | 10 |
| COPY DENSITY | DDD | 1 |
| ... | ... | ... |

FIG.24

| INSTRUCTION KEYWORD | EXECUTION COMMAND | NUMBER OF STOPS |
|---|---|---|
| 2-UP COPYING | AAA | 1 |
| TWO-SIDED COPYING | BBB | 3 |
| ONE-SIDED COPYING | CCC | 8 |
| COPY DENSITY | DDD | 35 |
| ... | ... | ... |

FIG.26

| INSTALLATION LOCATION | MODEL NAME | TABLE A | TABLE B |
|---|---|---|---|
| CONFERENCE ROOM 1 | aaa | TABLE Aa | TABLE Ba |
| CONFERENCE ROOM 2 | bbb | TABLE Ab | TABLE Bb |
| CONFERENCE ROOM 3 | ccc | TABLE Ac | TABLE Bc |
| ... | ... | ... | ... |

FIG.28

| INSTALLATION LOCATION | VERSION | TABLE A | TABLE B |
|---|---|---|---|
| CONFERENCE ROOM 1 | 5.1 | TABLE A51 | TABLE B51 |
| CONFERENCE ROOM 2 | 6.2 | TABLE A62 | TABLE B62 |
| CONFERENCE ROOM 3 | 7.1 | TABLE A71 | TABLE B71 |
| ... | ... | ... | ... |

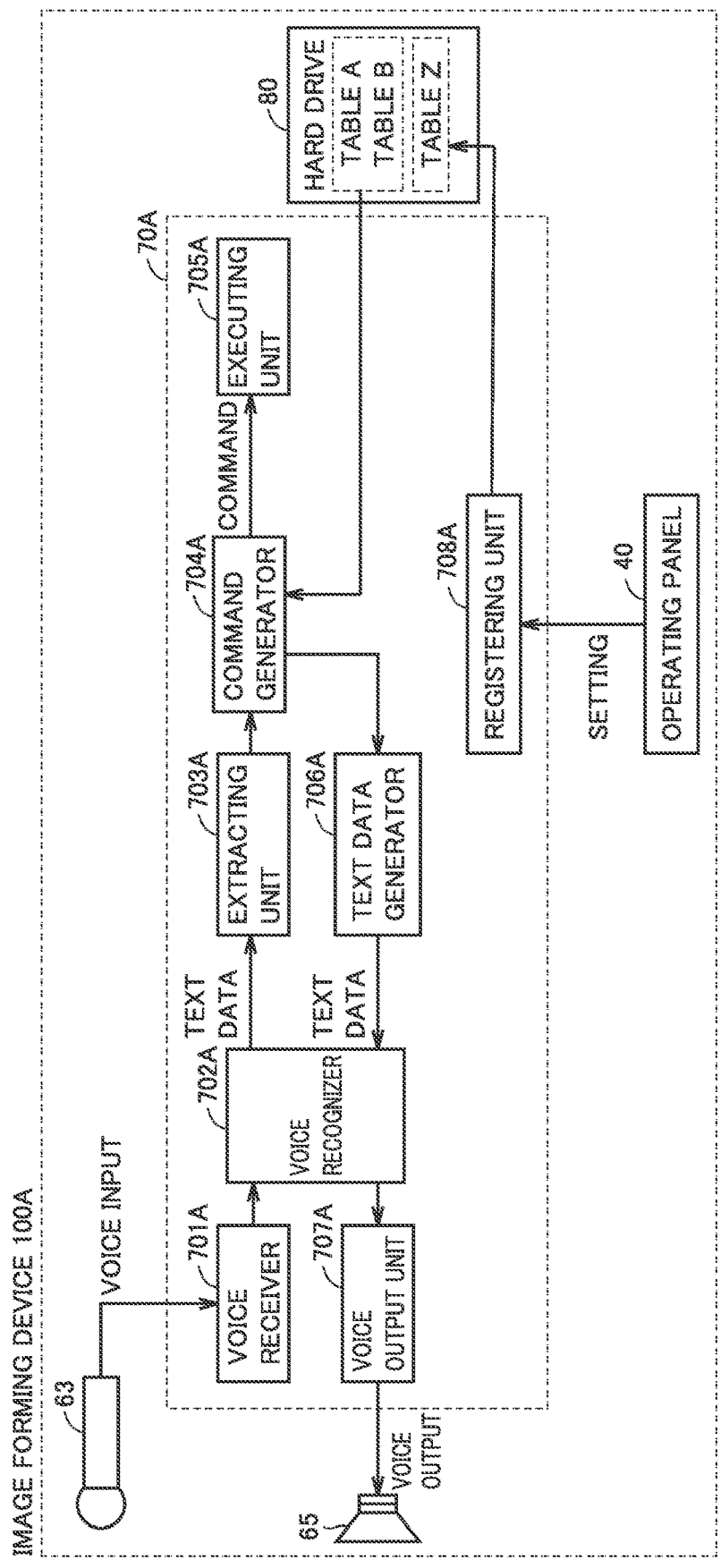

VOICE-OPERATED SYSTEM, CONTROLLER, COMPUTER-READABLE RECORDING MEDIUM, AND PROCESSING DEVICE

The entire disclosure of Japanese Patent Application No. 2019-126854, filed on Jul. 8, 2019, is incorporated herein by reference in its entirety.

BACKGROUND

Technological Field

The present disclosure relates to a voice-operated system, a controller, a computer-readable recording medium, and a processing device.

Description of the Related Art

In recent years, voice-operated processing devices have been known. Specifically, a controller, which can communicate with a processing device, receives input of voice from a voice-input device. Based on the input voice, the controller generates a command reflecting the user's instruction. The processing device then receives and executes the command. In this way, the processing device changes settings and executes jobs.

Japanese Laid-Open Patent Publication No. 2010-224890 discloses a technique to allow the user to easily and quickly switch the screen to an intended operation screen by voice from any operation screen being displayed (see [Abstract]).

SUMMARY

The processing devices execute various processes. In order to enable all the processes to be executed by voice, therefore, an enormous number of execution commands have to be developed, which would involve great man-hour for development and great cost. Limiting voice-activated processes to frequently executed processes would be able to reduce the man-hour for development and cost. In this case, however, the user cannot use voice-based operation for less frequently executed processes, thus experiencing reduced user operability. As such, there has been a demand for voice-based operation that involves reduced man-hour for development without compromising the operability as much as possible.

To achieve at least one of the abovementioned objects, according to an aspect of the present invention, a voice-operated system reflecting one aspect of the present invention comprises: a processing device; and a controller that communicates with the processing device. The processing device includes a first processor to perform: displaying, on an operating panel, an operation screen for instructing a process to be executed by the processing device, and receiving an instruction from a user; and executing a process corresponding to a command received from the controller. The controller includes a second processor to perform: generating the command for the processing device based on an input voice; and transmitting the command to the processing device. The generating of the command includes, when the voice instructs the processing device to execute a first process, generating a first command for instructing the operating panel to display the operation screen for instructing execution of the first process; and when the voice instructs the processing device to execute a second process, generating a second command for instructing execution of the second process.

To achieve at least one of the abovementioned objects, according to an aspect of the present invention, a controller that communicates with a processing device reflecting one aspect of the present invention comprises a processor to perform: generating a command for the processing device based on an input voice; and transmitting the command to the processing device. The generating of the command includes, when the voice instructs the processing device to execute a first process, generating a first command for instructing an operating panel of the processing device to display an operation screen for instructing execution of the first process; and when the voice instructs the processing device to execute a second process, generating a second command for instructing execution of the second process.

To achieve at least one of the abovementioned objects, according to an aspect of the present invention, a non-transitory computer-readable recording medium reflecting one aspect of the present invention stores a control program to be executed by a computer that communicates with a processing device, the control program causing the computer to execute: generating a command for the processing device based on an input voice; and transmitting the command to the processing device. The generating of the command includes, when the voice instructs the processing device to execute a first process, generating a first command for instructing an operating panel of the processing device to display an operation screen for instructing execution of the first process; and when the voice instructs the processing device to execute a second process, generating a second command for instructing execution of the second process.

To achieve at least one of the abovementioned objects, according to an aspect of the present invention, a processing device reflecting one aspect of the present invention comprises a processor to perform: receiving input of voice; displaying an operation screen on an operating panel; generating a command based on the input of voice; and executing a process corresponding to the command. The generating of the command includes, when the voice instructs the processing device to execute a first process, generating a first command for instructing the operating panel to display the operation screen for instructing execution of the first process; and when the voice instructs the processing device to execute a second process, generating a second command for instructing execution of the second process.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 6 shows a data structure of a table A.

FIG. 7 shows a data structure of a table B.

FIG. 20 shows a data structure of a table B1 in embodiment 2.

FIG. 22 shows a data structure of a table B2 in embodiment 2.

FIG. 24 shows a data structure of a table B3 in embodiment 2.

FIG. 26 shows a data structure of a table C in embodiment 3.

FIG. 28 shows a data structure of a table D in embodiment 3.

FIG. 31 shows a functional configuration of the image forming device in embodiment 4.

DETAILED DESCRIPTION OF EMBODIMENTS

Figure 1:
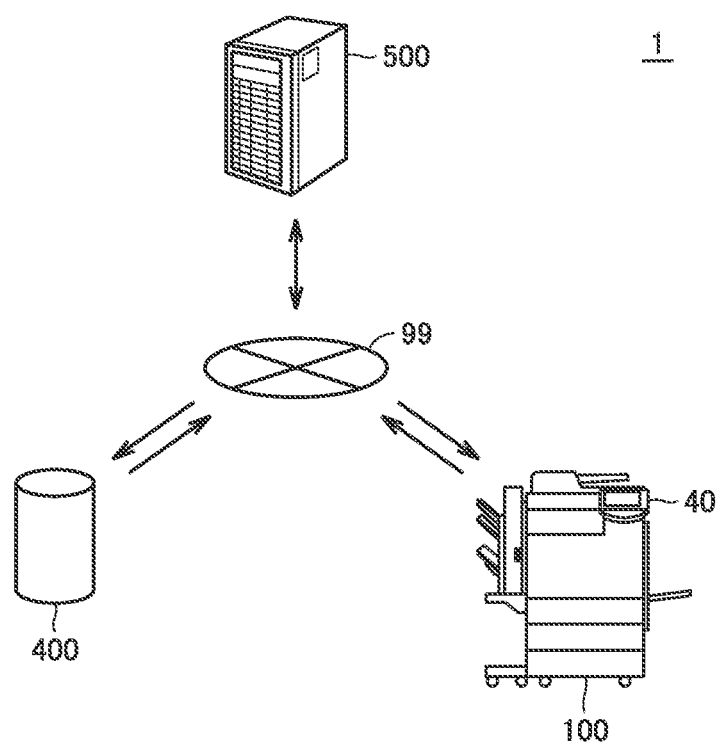
FIG. 1 shows a voice-operated system according to embodiment 1.

Hereinafter, one or more embodiments of the present invention will be described with reference to the drawings. However, the scope of the invention is not limited to the disclosed embodiments.

Embodiments will now be described in detail with reference to the drawings. In the drawings, like or corresponding parts are designated by like reference signs, and the description of such parts is not repeated.

Embodiment 1

FIG. 1 shows a voice-operated system 1 according to embodiment 1. Voice-operated system 1 includes a smart speaker 400, a server 500, and an image forming device 100. Smart speaker 400 is an example interactive electronic device. Server 500 is an example controller, which may also be a cloud server. Image forming device 100 is an example processing device. Image forming device 100 is a multi-function peripheral (MFP) provided with an authentication function. For use of image forming device 100, the user is required to input the ID on an operating panel 40 and have it authenticated. Server 500 is communicably connected to smart speaker 400 and image forming device 100 over a network 99.

Smart speaker 400 is a speaker that enables interactive voice-based operation. Smart speaker 400 receives a voice instruction for image forming device 100, and transmits data of the received voice to server 500. Smart speaker 400 produces voice from voice data generated by server 500 and outputs the voice.

Server 500 receives voice data from smart speaker 400, and produces text from the voice data. Server 500 extracts an instruction keyword from the text data. The instruction keyword is used for instructing image forming device 100 to execute a process. Server 500 generates a command by referring to tables of instruction keywords stored in image forming device 100 in advance, and transmits the command to image forming device 100.

When server 500 is to cause smart speaker 400 to output voice, server 500 transmits, to smart speaker 400, data of voice to be output from smart speaker 400. When the user performs a setting operation on an operation screen displayed on operating panel 40, server 500 receives the screen ID of the operation screen from image forming device 100. Server 500 then registers, in association with one another, an instruction keyword, the screen ID, and the user ID logged in on image forming device 100.

Image forming device 100 is a multi-function peripheral (MFP) provided with multiple functions, such as a scanner function, a copying function, a facsimile function, a network function, and a BOX function. Image forming device 100 executes a process based on a command received from server 500. When a setting operation is performed on operating panel 40, image forming device 100 transmits, to server 500, the screen ID of the operation screen operated by the user, in association with the user ID logged in on image forming device 100. Image forming device 100 is not limited to a multi-function peripheral, and may be implemented in any form, such as a copier, a printer, or a facsimile. Image forming device 100 may perform authentication by IC card or biometrically, instead of requiring input of ID.

Figure 2:
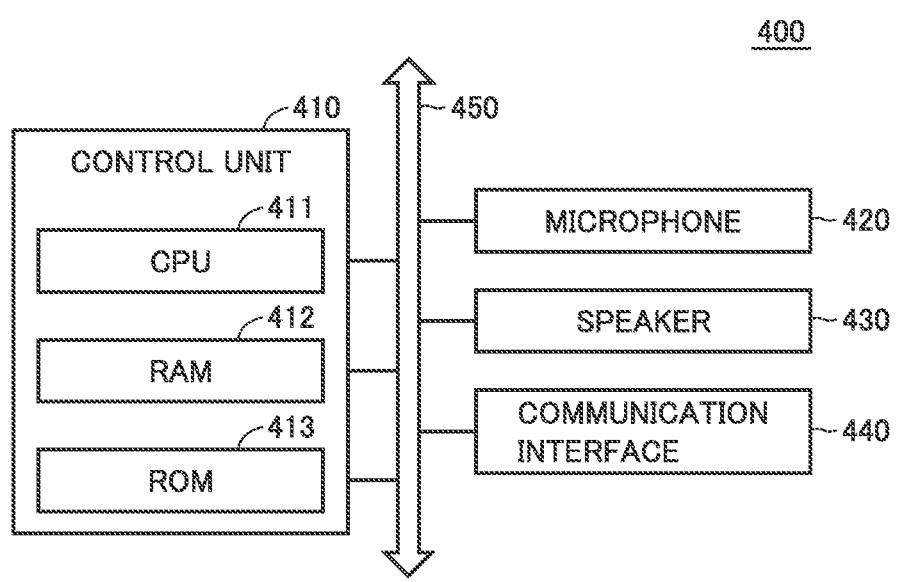
FIG. 2 is a block diagram showing a hardware configuration of a smart speaker.

FIG. 2 is a block diagram showing a hardware configuration of smart speaker 400. Smart speaker 400 includes a control unit 410, a microphone 420, a speaker 430, and a communication interface 440. Control unit 410, microphone 420, speaker 430, and communication interface 440 are connected through a bus 450.

Control unit 410 includes a central processing unit (CPU) 411, a random access memory (RAM) 412, and a read only memory (ROM) 413. CPU 411 generally controls the overall smart speaker 400 by executing an operational program stored in, for example, ROM 413. ROM 413 stores a program to be executed by CPU 411 and other data. RAM 412, which serves as a workspace for CPU 411 to execute a program, temporarily stores the program and data for execution of the program.

Microphone 420 receives an instruction for image forming device 100 by voice.

Speaker 430 produces voice from voice data generated by server 500 and outputs the voice.

Communication interface 440 transmits and receives voice data to and from server 500 over network 99.

Figure 3:
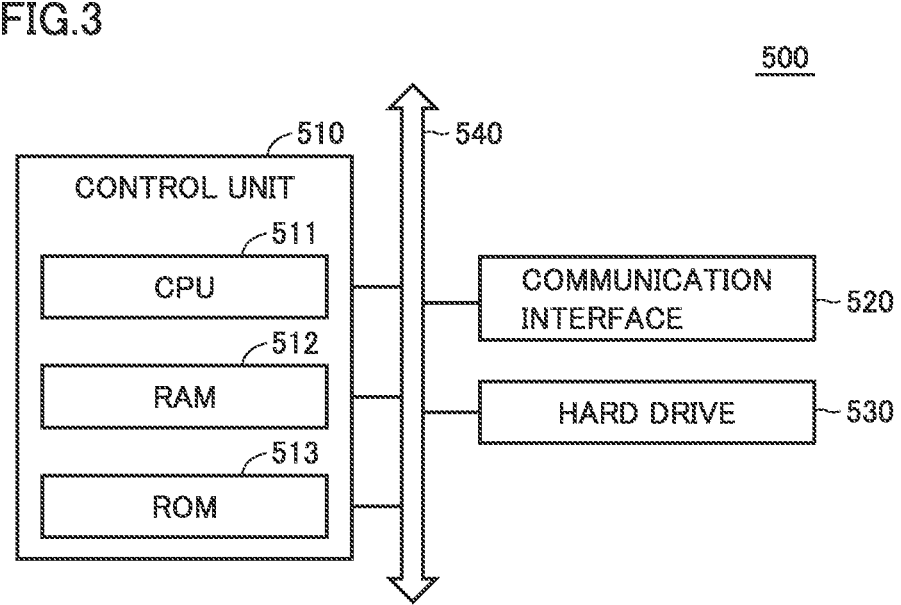
FIG. 3 is a block diagram showing a hardware configuration of a server.

FIG. 3 is a block diagram showing a hardware configuration of server 500. Server 500 includes a control unit 510, a communication interface 520, and a hard drive 530. Control unit 510, communication interface 520, and hard drive 530 are connected through a bus 540.

Control unit 510 includes a CPU 511, a RAM 512, and a ROM 513. CPU 511 generally controls the overall server 500 by executing an operational program stored in, for example, ROM 513. ROM 513 stores a program to be executed by CPU 511 and other data. RAM 512, which serves as a workspace for CPU 511 to execute a program, temporarily stores the program and data for execution of the program.

Communication interface 520 transmits and receives voice data to and from smart speaker 400 over network 99. Communication interface 520 transmits a command to image forming device 100 over network 99. Communication interface 520 receives, from image forming device 100 over network 99, the screen ID of an operation screen operated by the user.

Hard drive 530 stores various tables. The various tables include, for example, a table A and a table B. The details of tables A and B are described later with reference to FIGS. 6 and 7.

Figure 4:
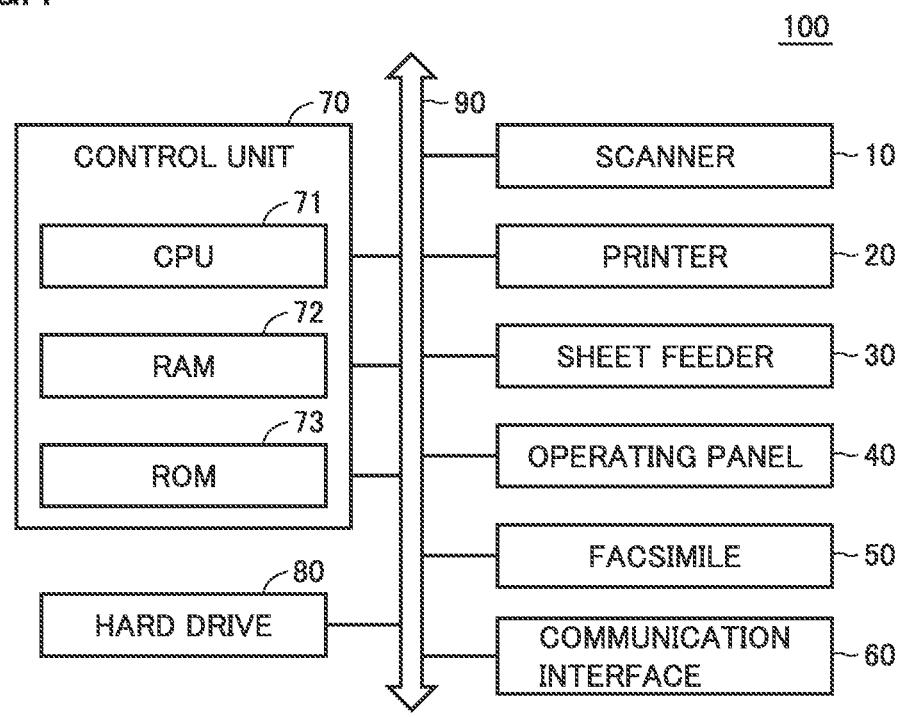
FIG. 4 is a block diagram showing a hardware configuration of an image forming device.

FIG. 4 is a block diagram showing a hardware configuration of image forming device 100. Image forming device 100 includes a scanner 10, a printer 20, a sheet feeder 30, an operating panel 40, a facsimile 50, a communication interface 60, a control unit 70, and a hard drive 80. Scanner 10, printer 20, sheet feeder 30, operating panel 40, facsimile 50, communication interface 60, control unit 70, and hard drive 80 are connected through a bus 90.

Scanner 10 optically reads documents and converts them into images.

Printer 20 prints images on sheets. Printer 20 includes a photoconductive drum and an exposure device for forming toner images of yellow, magenta, cyan, and black. Printer 20 superposes and transfers toner images of these colors onto a transfer belt, and transfers the superposed toner images onto sheets conveyed from sheet feeder 30. The sheets with toner images transferred thereon are ejected to a document output tray.

Sheet feeder 30 stores sheets to be supplied to printer 20.

Operating panel 40 receives an input operation from the user. Operating panel 40 includes a touch-panel display on which to display various operation screens.

Facsimile 50 connects to a telephone line for transmitting and receiving image data to and from other devices.

Communication interface 60 communicates with server 500 over network 99. Communication interface 60 receives a command from server 500. Communication interface 60 transmits, to server 500, the screen ID of an operation screen operated by the user.

Control unit 70 includes a CPU 71, a RAM 72, and a ROM 73. CPU 71 generally controls the overall image forming device 100 by executing an operational program stored in, for example, ROM 73. ROM 73 stores a program to be executed by CPU 71 and other data. RAM 72, which serves as a workspace for CPU 71 to execute a program, temporarily stores the program and data for execution of the program.

Hard drive 80 stores programs and various types of data. The various types of data include, for example, image data.

Figure 5:
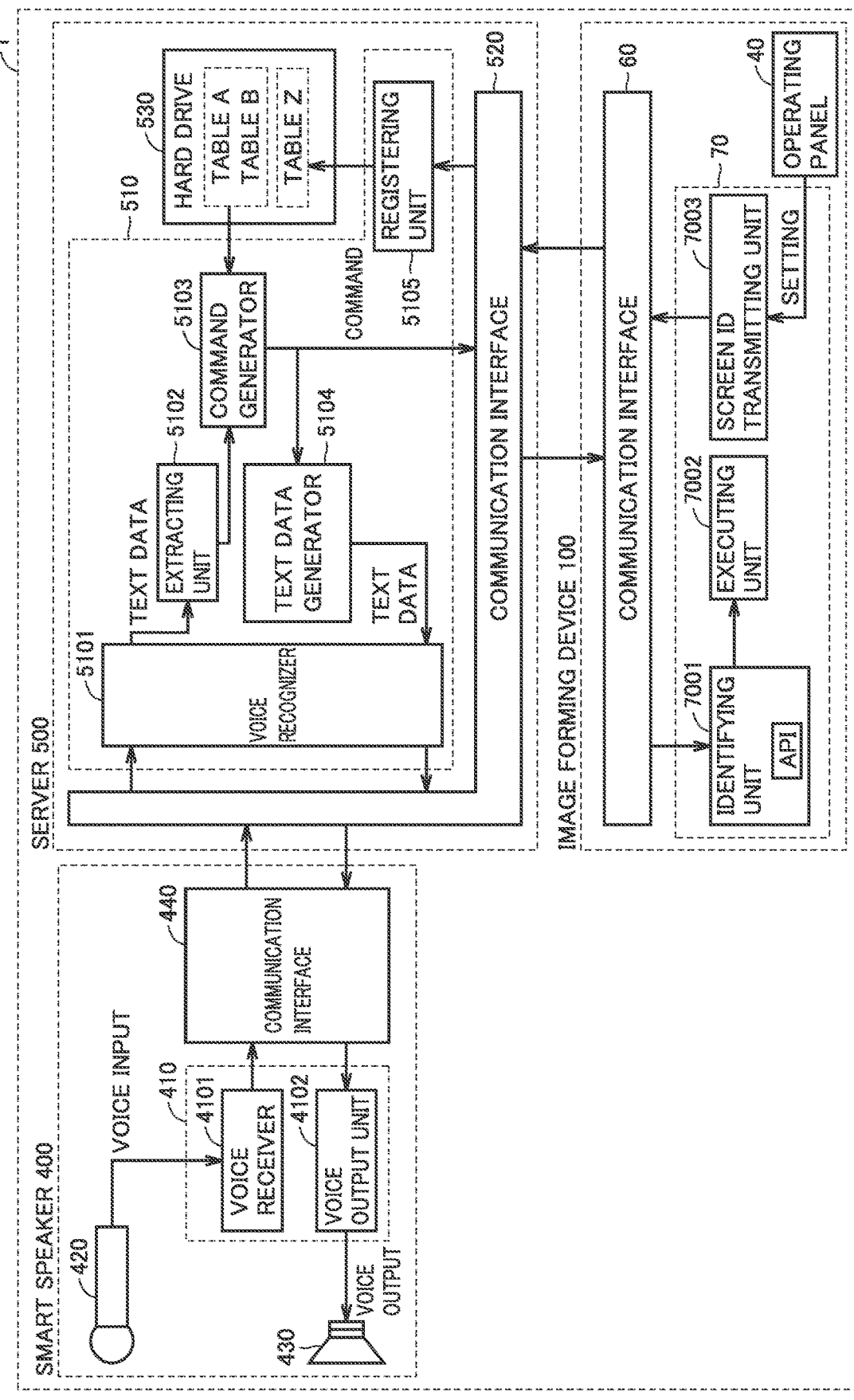
FIG. 5 shows a functional configuration of a voice-operated system.

FIG. 5 shows a functional configuration of voice-operated system 1. Voice-operated system 1 is composed of smart speaker 400, server 500, and image forming device 100.

The functional configuration of smart speaker 400 will now be described. A voice receiver 4101 receives an instruction for image forming device 100 by voice through microphone 420. Voice receiver 4101 converts the received voice into voice data, and transmits the voice data to server 500 via communication interface 440. A voice output unit 4102 receives the voice data from server 500 via communication interface 440, produces voice from the voice data, and outputs the voice through speaker 430. The processes at voice receiver 4101 and voice output unit 4102 are implemented by CPU 411 executing predetermined programs stored in ROM 413.

The functional configuration of server 500 will now be described. A voice recognizer 5101 receives voice data from smart speaker 400 via communication interface 520, and generates text data corresponding to the voice data. Voice recognizer 5101 converts text data generated by a text data generator 5104 into voice data, and transmits the voice data to smart speaker 400 via communication interface 520.

An extracting unit 5102 extracts an instruction keyword from the generated text data.

A command generator 5103 generates a command by referring to table A or B in hard drive 530, and transmits the command to image forming device 100. The details of the process at command generator 5103 are described later with reference to FIG. 9.

Text data generator 5104 generates text data for voice to be output through smart speaker 400 when a screen transition command is generated by command generator 5103 or when no command is generated by command generator 5103. The details of the processes for instructing smart speaker 400 to output voice, performed by text data generator 5104 and voice recognizer 5101, are described later with reference to FIG. 10.

When the user performs a setting operation on an operation screen displayed on operating panel 40, a registering unit 5105 stores, in association with one another in a table Z in hard drive 530, an instruction keyword, the screen ID of the operation screen, and the user ID logged in on image forming device 100. Table Z, which is provided for each user, records the tendency (e.g., setting operations in the past) for each user. Registering unit 5105 selects table Z for the user logged in on image forming device 100, and stores, in association with each other in table Z, an instruction keyword and the screen ID of operation screen. The information stored in table Z is referred to for identifying the operation screen to be displayed on operating panel 40 next time the same user utters the same instruction keyword. The details of the process at registering unit 5105 are described later with reference to FIG. 11.

The processes at voice recognizer 5101, extracting unit 5102, command generator 5103, text data generator 5104, and registering unit 5105 are implemented by CPU 511 executing predetermined programs stored in ROM 513.

The functional configuration of image forming device 100 will now be described. An identifying unit 7001 receives a command from server 500 via communication interface 60, and identifies the process details of the command. An executing unit 7002 executes a process based on the process details identified by identifying unit 7001. The details of the processes at identifying unit 7001 and executing unit 7002 are described later with reference to FIG. 14.

When the user performs a setting operation on an operation screen displayed on operating panel 40, a screen ID transmitting unit 7003 transmits, to server 500 via communication interface 60, the screen ID of the operation screen in association with the logged in user ID. The details of the process at screen ID transmitting unit 7003 are described later with reference to FIG. 15.

The processes at identifying unit 7001, executing unit 7002, and screen ID transmitting unit 7003 are implemented by CPU 71 executing predetermined programs stored in ROM 73.

FIG. 6 shows a data structure of table A. Table A is stored in hard drive 530 in advance and referred to in the process performed by command generator 5103.

Table A associates instruction keywords with screen IDs. Each screen ID is the identification information of an operation screen displayed on operating panel 40. Each screen ID associated with an instruction keyword is the identification information of an operation screen displayed on operating panel 40 when the user instructs the execution of the process corresponding to the instruction keyword. Table A further associates the instruction keywords with screen IDs of higher-level screens. Each screen ID of higher-level screen associated with an instruction keyword is the identification information of an operation screen located at a higher-level hierarchy relative to an operation screen displayed on operating panel 40 when the user instructs the execution of the process corresponding to the instruction keyword. In the field of "screen ID of higher-level screen" screen IDs of higher-level screens are provided in order of increasing deepness in hierarchy level.

For example, the screen ID of operation screen corresponding to the instruction keyword "copying and stapling" is "12128". The screen ID of operation screen located one level higher than the operation screen corresponding to the instruction keyword "copying and stapling" is "12100". The screen ID of operation screen located two levels higher than the operation screen corresponding to the instruction keyword "copying and stapling" is "12000". The screen ID of operation screen located three levels higher than the operation screen corresponding to the instruction keyword "copying and stapling" is "10000".

FIG. 7 shows a data structure of table B. Table B is stored in hard drive 530 in advance and referred to in the process performed by command generator 5103.

Table B associates instruction keywords with execution commands. The instruction keywords stored in table B correspond to frequently used processes, among the instruction keywords stored in table A. Each execution command is a command for instructing image forming device 100 to execute the process corresponding to an instruction keyword. For example, the execution command corresponding to the instruction keyword "2-up copying" is "AAA".

[Process at Server 500]

Figure 8:
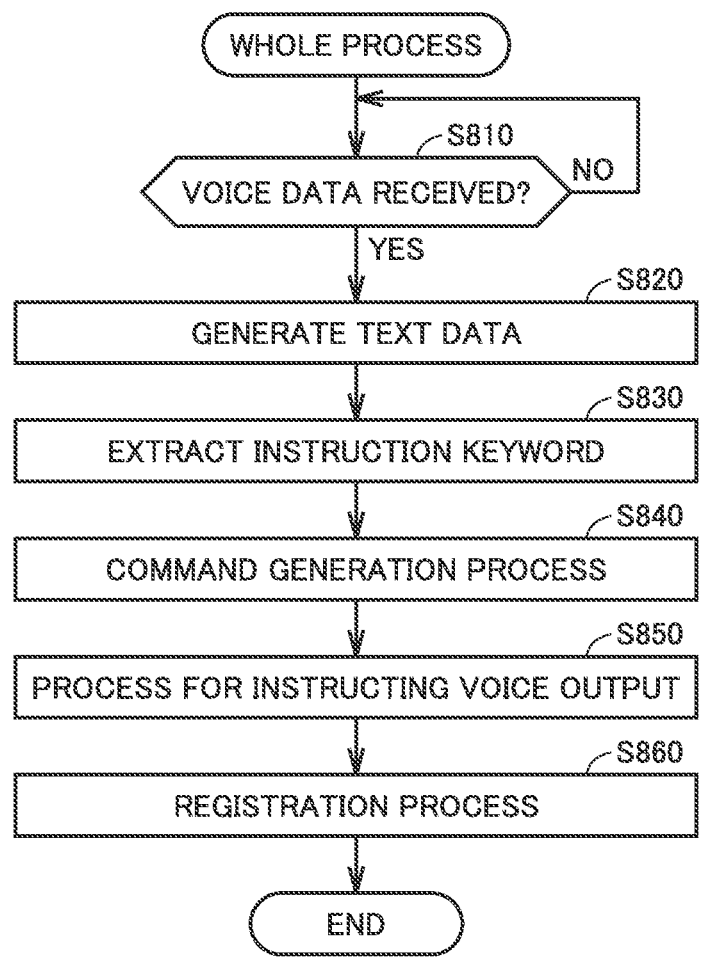
FIG. 8 is a flowchart showing the whole process at the server.

With reference to FIGS. 8 to 11, the process at sever 500 will now be described. FIG. 8 is a flowchart showing the whole process at server 500. The process shown in FIG. 8 is implemented by CPU 511 executing a predetermined program stored in ROM 313.

First, control unit 510 determines whether or not it has received voice data from smart speaker 400 (step S810). Until receiving voice data from smart speaker 400, control unit 510 repeats step S810. When control unit 510 receives voice data from smart speaker 400 (YES at step S810), control unit 510 proceeds to step S820.

At step S820, control unit 510 generates text data corresponding to the received voice data.

Then, control unit 510 extracts an instruction keyword from the text data (step S830).

Then, control unit 510 performs a command generation process (step S840). The command generation process is a process for generating a command by referring to table A or B in hard drive 530 based on the instruction keyword extracted at step S830, and transmitting the command to image forming device 100. The details of the command generation process are described later with reference to FIG. 9.

Then, control unit 510 performs a process for instructing voice output (step S850). The process for instructing voice output is a process for instructing smart speaker 400 to output a voice when a screen transition command is generated at step S84 or when no command is generated at step S840. The details of the process for instructing voice output are described later with reference to FIG. 10.

Then, control unit 510 performs a registration process (step S860). The registration process is a process for, when the user performs a setting operation on an operation screen displayed on operating panel 40, storing, in association with one another in table Z in had drive 530, an instruction keyword, the screen ID of the operation screen, and the user ID logged in on image forming device 100. The details of the registration process are described later with reference to FIG. 11.

After step S860, control unit 510 ends a series of processes shown in FIG. 8.

Figure 9:
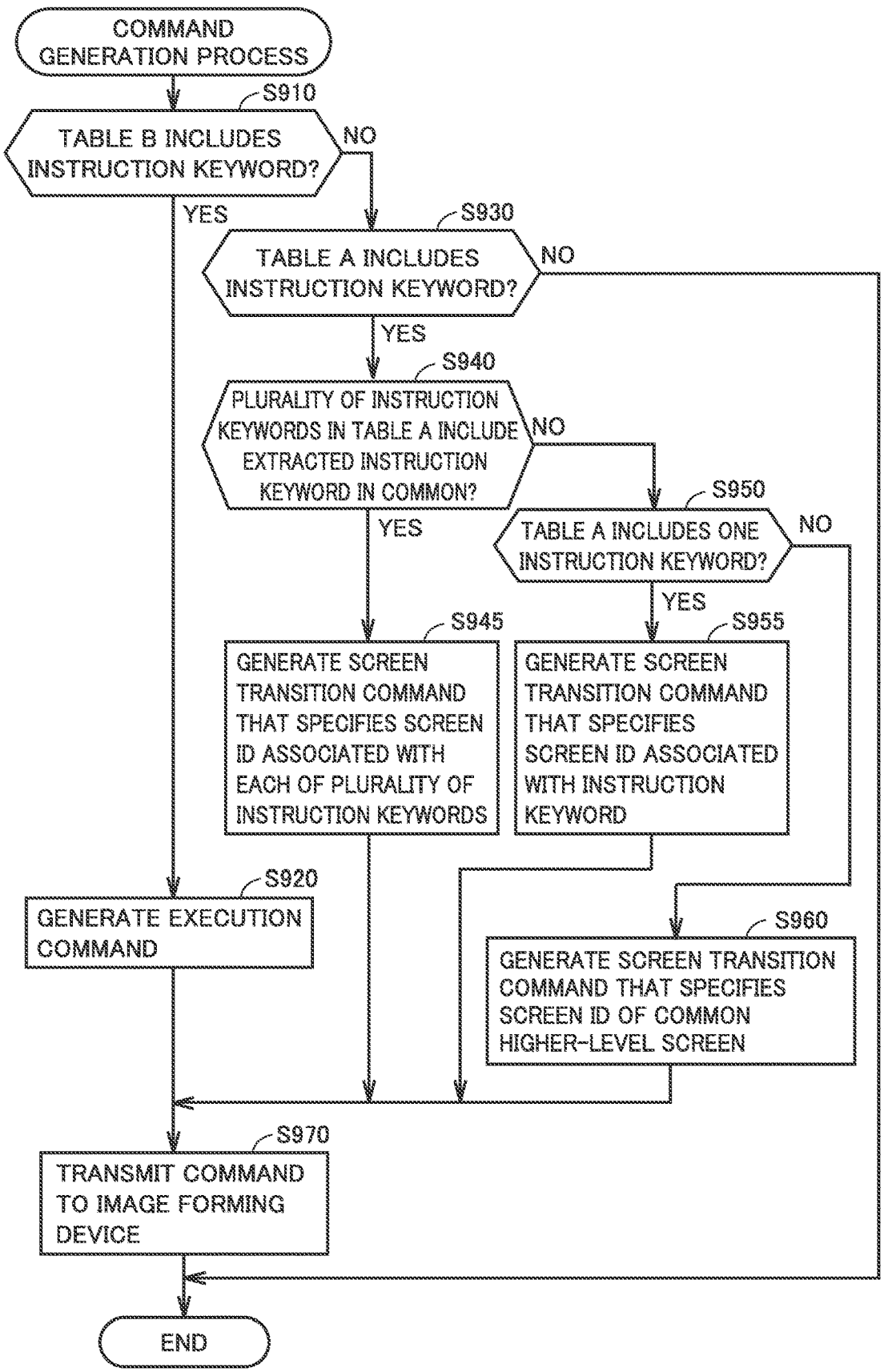
FIG. 9 is a flowchart showing a command generation process.

FIG. 9 is a flowchart showing the command generation process. The process shown in FIG. 9 is implemented by CPU 511 executing a predetermined program stored in ROM 513.

First, control unit 510 determines whether or not the instruction keyword extracted at step S830 is included in table B (step S910). When the instruction keyword extracted at step S830 is included in table B (YES at step S910), control unit 510 proceeds to step S920. On the other hand, when the instruction keyword extracted at step S830 is not included in table B (NO at step S910), control unit 510 proceeds to step S930.

At step S920, control unit 510 generates an execution command corresponding to the instruction keyword by referring to table B. For example, when the instruction keyword is "2-up copying", control unit 510 generates the execution command "AAA".

At step S930, control unit 510 determines whether or not the instruction keyword extracted at step S830 is included in table A. When the instruction keyword extracted at step S830 is included in table A (YES at step S930), control unit 510 proceeds to step S940. On the other hand, when the instruction keyword extracted at step S830 is not included in table A (NO at step S930), control unit 510 ends a series of processes shown in FIG. 9.

At step S940, control unit 510 determines whether or not the instruction keyword extracted at step S830 is included in a plurality of instruction keywords in table A in common. For example, when the instruction keyword extracted at step S830 is "color", "color" is included in "color copying" and "color scanning". Thus, control unit 510 determines that the instruction keyword extracted at step S830 is included in a plurality of instruction keywords in table A in common. When the instruction keyword extracted at step S830 is included in a plurality of instruction keywords in table A in common (YES at step S940), control unit 510 proceeds to step S945. On the other hand, when the instruction keyword extracted at step S830 is not included in a plurality of instruction keywords in table A in common (NO at step S940), control unit 510 proceeds to step S950.

At step S945, control unit 510 generates a screen transition command that specifies the screen ID associated with each of the plurality of instruction keywords that include the instruction keyword extracted at step S830 in common, among the instruction keywords included in table A. For example, when the instruction keyword is "color", control unit 510 generates a screen transition command that specifies the screen ID "12125" and a screen transition command that specifies the screen ID "15125". If, in table Z, the instruction keyword extracted at step S830 has already been associated with a screen ID of operation screen that has ever been operated by the user, then at step S945, control unit 510 may generate only a screen transition command that specifies the screen ID.

At step S950, control unit 510 determines whether or not the number of instruction keywords extracted at step S830 and included in table A is one. When the number of instruction keywords extracted at step S830 and included in table A is one (YES at step S950), control unit 510 proceeds to step S955. On the other hand, when the number of instruction keywords extracted at step S830 and included in table A is more than one (NO at step S950), control unit 510 proceeds to step S960.

At step S955, control unit 510 generates a screen transition command that specifies the screen ID associated with the instruction keyword extracted at step S830 in table A. For example, when the instruction keyword is "copying and stapling", control unit 510 generates a screen transition command that specifies the screen ID "12128".

At step S960, control unit 510 generates a screen transition command that specifies a common screen ID, among the screen IDs of higher-level screens associated with each of the instruction keywords extracted at step S830 in table A. If there are a plurality of common screen IDs, control unit 510 generates a screen transition command that specifies the lowest-hierarchy-level screen ID, among the plurality of common screen IDs. For example, when the instruction keywords are "color copying" and "copying and stapling", control unit 510 generates a screen transition command that specifies the screen ID "12100".

After step S920, step S945, step S955, or step S960, control unit 510 proceeds to step S970. At step S970, control unit 510 transmits the execution command or screen transition command to image forming device 100 via communication interface 520. After step S970, control unit 510 ends a series of processes shown in FIG. 9.

The execution command includes a plurality of commands, such as the "AAA" command instructing "copy" a document in "2-up"; whereas the screen transition command includes only one command instructing display of a specified screen on operating panel 40.

The execution command is not limited to a command that instructs image forming device 100 to execute a printing process. The execution command may be a command that instructs image forming device 100 to only set a printing condition, without going as far as the execution of a printing process. For example, the "AAA" command may be a command that instructs image forming device 100 to copy a document in 2-up format, or may be a command that instructs image forming device 100 to set the printing condition to copying a document in 2-up format.

In some cases, when a plurality of instruction keywords are extracted at step S830, the instruction keywords may include both an instruction keyword included in table B and an instruction keyword included in only table A. In such cases, control unit 510 may generate an execution command for an instruction keyword included in table B and generate a screen transition command for an instruction keyword included in only table A, then transmitting these commands to image forming device 100.

Figure 10:
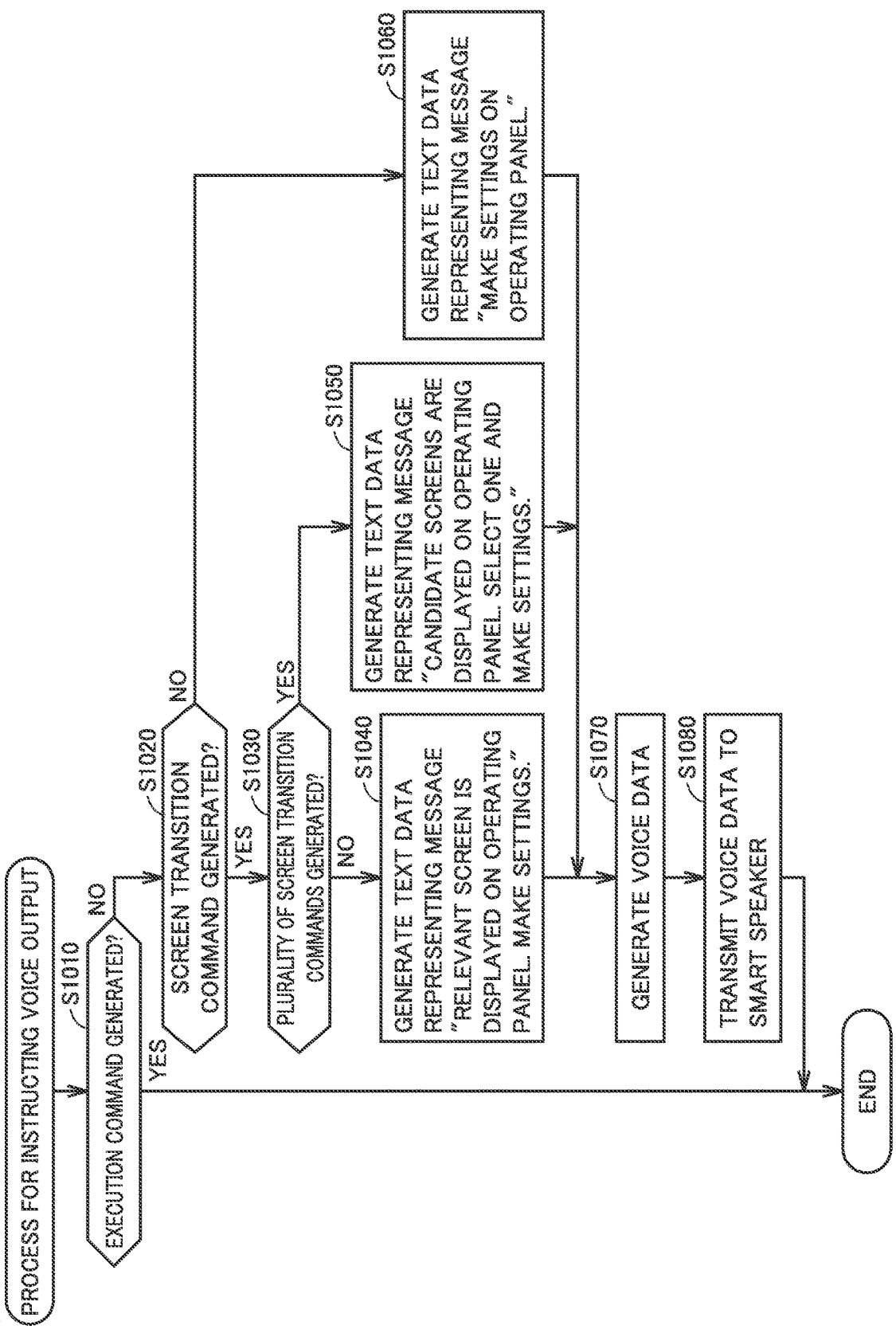
FIG. 10 is a flowchart showing a process for instructing voice output.

FIG. 10 is a flowchart showing the process for instructing voice output. The process shown in FIG. 10 is implemented by CPU 511 executing a predetermined program stored in ROM 513.

First, control unit 510 determines whether or not an execution command has been generated at step S840 (step S1010). When an execution command has been generated at step S840 (YES at step S1010), control unit 510 ends a series of processes shown in FIG. 10. On the other hand, when an execution command has not been generated at step S840 (NO at step S1010), control unit 510 proceeds to step S1020.

At step S1020, control unit 510 determines whether or not a screen transition command has been generated at step S840. When a screen transition command has been generated at step S840 (YES at step S1020), control unit 510 proceeds to step S1030. On the other hand, when a screen transition command has not been generated at step S840 (NO at step S1020), control unit 510 proceeds to step S1060.

At step S1030, control unit 510 determines whether or not a plurality of screen transition commands have been generated at step S840. When a plurality of screen transition commands have been generated at step S840 (YES at step S1030), control unit 510 proceeds to step S1050. On the other hand, when a plurality of screen transition commands have not been generated at step S840 (NO at step S1030), control unit 510 proceeds to step S1040.

At step S1040, control unit 510 generates text data representing the message "The relevant screen is displayed on operating panel 40. Make settings."

At step S1050, control unit 510 generates text data representing the message "The candidate screens are displayed on operating panel 40. Select one and make settings."

At step S1060, control unit 510 generates text data representing the message "Make settings on operating panel 40."

After step S1040, step S1050, or step S1060, control unit 310 generates voice data corresponding to the text data (step S1070).

Then, control unit 510 transmits the voice data to smart speaker 400 via communication interface 520 (step S1080). Smart speaker 400 receives the voice data from server 500, and produces voice from the voice data and outputs the voice.

After step S1080, control unit 510 ends a series of processes shown in FIG. 10.

Figure 11:
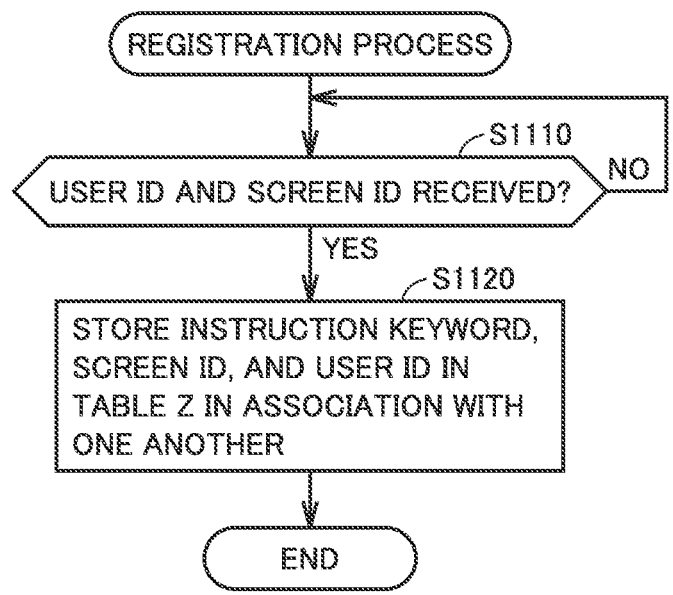
FIG. 11 is a flowchart showing a registration process.

FIG. 11 is a flowchart showing the registration process. The process shown in FIG. 11 is implemented by CPU 511 executing a predetermined program stored in ROM 513.

First, control unit 510 determines whether or not it has received, from image forming device 100, a user ID logged in on image forming device 100 and the screen ID of an operation screen operated by the user (step S1110). Control unit 510 repeats step S1110 until receiving, from image forming device 100, a user ID logged in on image forming device 100 and the screen ID of an operation screen operated by the user. When control unit 510 receives, from image forming device 100, a user ID logged in on image forming device 100 and the screen ID of an operation screen operated by the user (YES at step S1110), control unit 510 proceeds to step S120.

At step S1120, control unit 510 stores, in association with one another in table Z in hard drive 330, the instruction keyword extracted at step S830, the screen ID sent from image forming device 100, and the user ID logged in on image forming device 100 sent from image forming device 100. Control unit 510 selects table Z of the user logged in on image forming device 100, and stores, in association with each other in table Z, the instruction keyword and the screen ID of operation screen. The information stored in hard drive 530 is referred to for identifying the operation screen to be displayed on operating panel 40 next time the same user utters the sane instruction keyword.

After step S1120, control unit 510 ends a series of processes shown in FIG. 11.

[Process at Smart Speaker 400]

Figure 12:
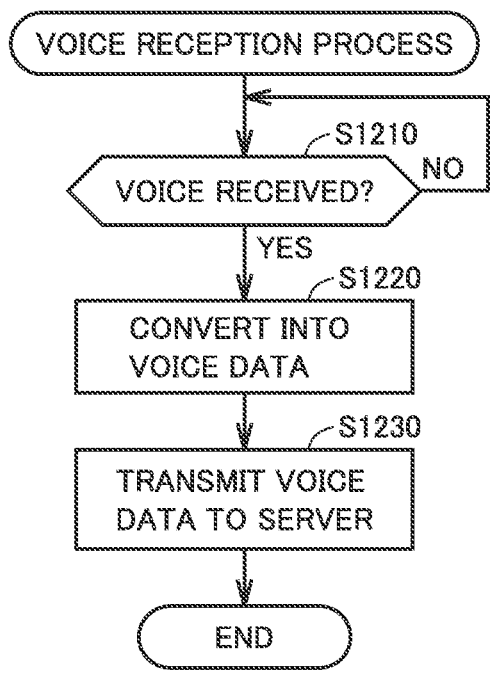
FIG. 12 is a flowchart showing a voice reception process.
Figure 13:
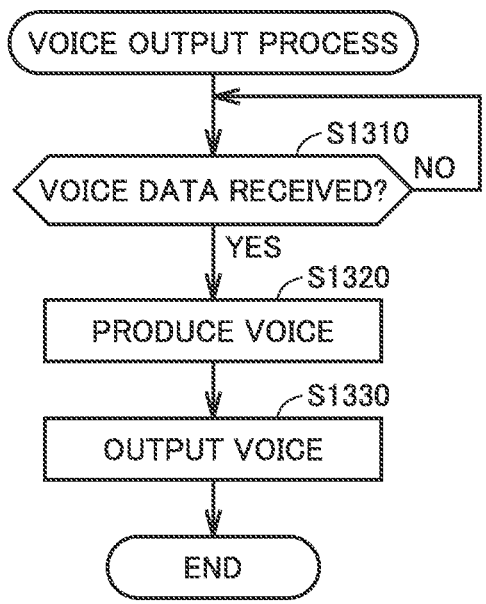
FIG. 13 is a flowchart showing a voice output process.

With reference to FIGS. 12 and 13, the process at smart speaker 400 will now be described. FIG. 12 is a flowchart showing a voice reception process. The voice reception process is a process for converting received voice into voice data and transmitting the voice data to server 500. The voice reception process is implemented by CPU 411 executing a predetermined program stored in ROM 413.

First, control unit 410 determines whether or not it has received voice (step S1210). Until receiving voice, control unit 410 repeats step S1210. When control unit 410 receives voice (YES at step S1210), control unit 410 proceeds to step S1220.

At step S1220, control unit 410 converts the received voice into voice data.

Then, control unit 410 transmits the voice data to server 500 via communication interface 440 (step S1230). After step S1230, control unit 410 ends a series of processes shown in FIG. 12.

FIG. 13 is a flowchart showing a voice output process. The vice output process is a process for producing voice from the voice data received from server 500, and outputting the voice. The voice output process is implemented by CPU 411 executing a predetermined program stored in ROM 413.

First, control unit 410 determines whether or not it has received voice data from server 500 (step S310). Until receiving voice data from server 50, control unit 410 repeats step S1310. When control unit 410 receives voice data from server 500 (YES at step S1310) control unit 410 proceeds to step S1320.

At step S1320, control unit 410 produces voice from the voice data.

Then, control unit 410 outputs the voice through speaker 430 (step S1330). After step S1330, control unit 410 ends a series of processes shown in FIG. 13.

[Process at Image Forming Device 100]

Figure 14:
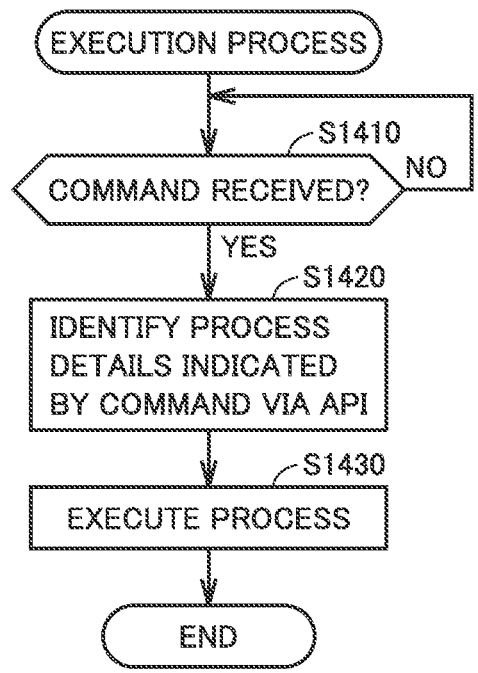
FIG. 14 is a flowchart showing an execution process.
Figure 15:
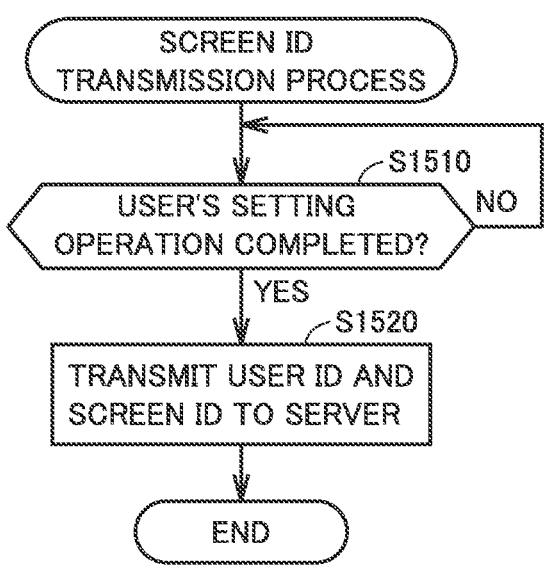
FIG. 15 is a flowchart showing a screen ID transmission process.

With reference to FIGS. 14 and 15, the process at image forming device 100 will now be described. FIG. 14 is a flowchart showing an execution process. The execution process is a process for executing a command sent from server 50. The execution process is implemented by CPU 71 executing a predetermined program stored in ROM 73.

First, control unit 70 determines whether or not it has received a command from server 500 (step S1410). Until receiving a command from server 500, control unit 70 repeats step S410. When control unit 70 receives a command from server 500 (YES at step S1410), control unit 70 proceeds to step S1420. The command is the command generated at step S840, which is an execution command and/or a screen transition command.

At step S1420, control unit 70 identifies the process details indicated by the command, via an application programming interface (API).

Then, control unit 70 executes a process in accordance with the identified process details (step S1430). For example, wen the command sent from server 500 is the execution command "AAA" control unit 70 copies in 2-up format a document placed on image forming device 100. As another example, when the command sent from server 500 is the screen transition command that specifies the screen ID "12128", control unit 70 displays, on operating panel 40, a stapling operation screen among copying operation screens.

After step S1430, control unit 70 ends a series of processes shown in FIG. 14.

FIG. 15 is a flowchart showing a screen ID transmission process. The screen ID transmission process is a process for, when the user's setting operation on operating panel 40 has been completed, transmitting, to server 500, the screen ID of the operation screen operated by the user. The screen ID transmission process is implemented by CPU 71 executing a predetermined program stored in ROM 73.

First, control unit 70 determines whether or not the uses setting operation on operating panel 40 has been completed (step S1510). Until the user's setting operation on operating panel 40 is completed, control unit 70 repeats step S1510. Wien the users setting operation on operating panel 40 is completed (YES at step S1510), control unit 70 proceeds to step S1520. When the user presses "Set" or "OK" on operating panel 44), or when the operation screen switches to another screen after the uses operation on operating panel 40, control unit 70 determines that the users setting operation on operating panel 40 as been completed.

At step S1520, control unit 70 transmits, to server 500 via communication interface 60, the screen ID of the operation screen operated by the user and the user ID logged in on image forming device 100, in association with each other. After step S1520, control unit 70 ends a series of processes shown in FIG. 13.

In a series of processes shown in FIG. 15, in some cases, server 500 may not be able to narrow down the target screen candidates to one screen when the user has uttered an instruction keyword, and the user may select one of the target screen candidates displayed on operating panel 40. In such cases, the screen ID of an operation screen selected by the user is transmitted to server 500 in association with the user ID. In other cases, de user may perform a setting operation on operating panel 40 when an instruction keyword uttered by the user is included in neither table A nor table B. In such cases, the screen ID of the operation screen operated by the user is transmitted to server 500 in association with the user ID,

[A Series of Processes in Voice-Operated System 1]

Figure 16:
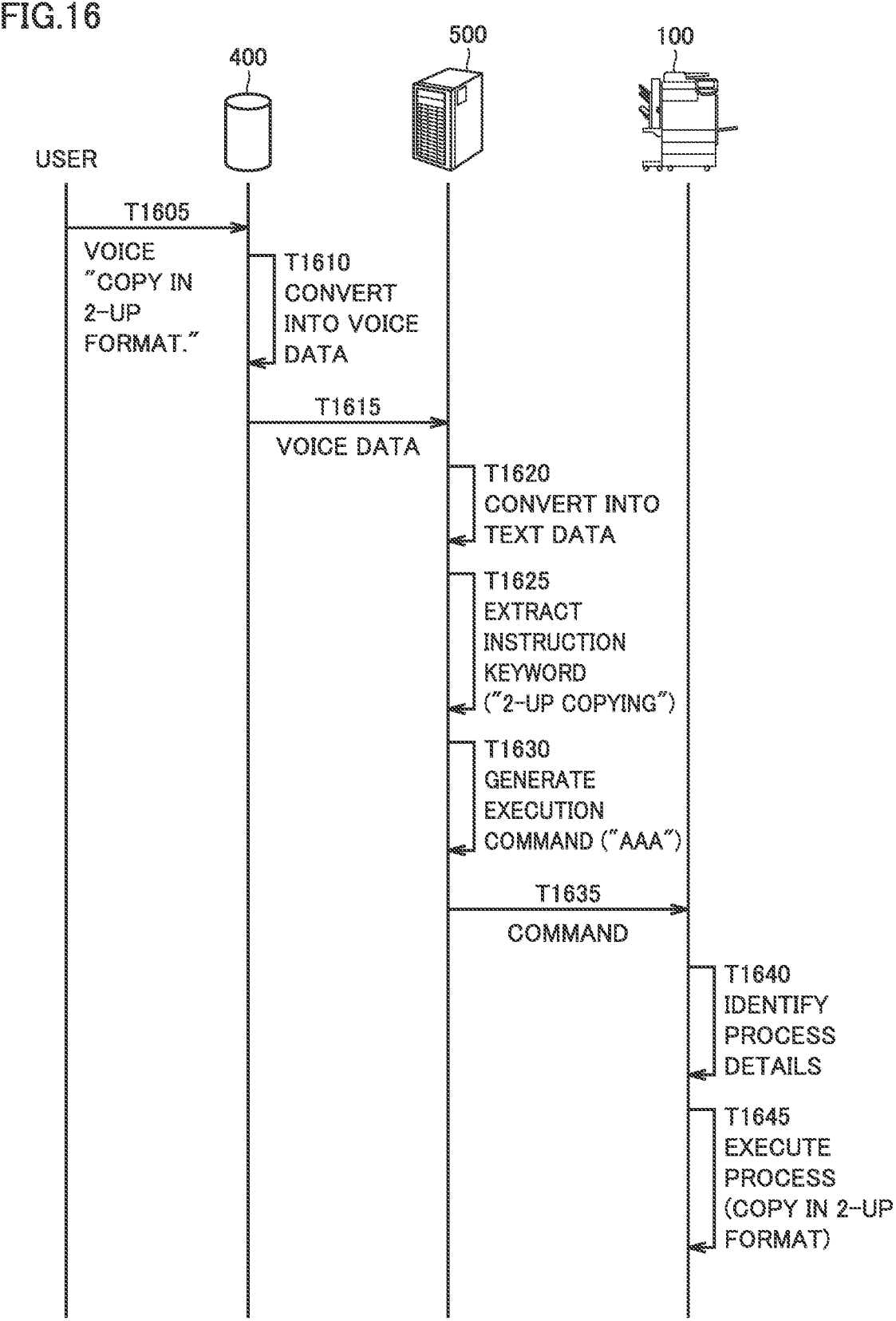
FIG. 16 is a sequence diagram for describing a series of processes at the voice-operated system performed when an instruction keyword is included in table B.

With reference to FIGS. 16 to 19, a series of processes in voice-operated system 1 will now be described. FIG. 16 is a sequence diagram for describing a series of processes in voice-operated system 1 performed when an instruction keyword is included in table B.

When the user utters "Copy in 2-up format" (T1605), smart speaker 400 converts the voice into voice data (T1610). Smart speaker 400 then transmits the voice data to server 500 (T1613).

Server 500 produces text from the voice data sent from start speaker 400 (T1620), and extracts the instruction keyword "2-up copying" (T1625). Server 500 generates the execution command "AAA" by referring to table B (T1630). Server 500 transmits the execution command "AAA" to image forming device 100 (T1635).

Image forming device 100 receives the command from server 500, identifies the process details indicated by the command (T1640), and then executes a process in accordance with the identified process details (T1645). That is, image forming device 100 copies a document placed on image forming device 100 in 2-up format.

With a series of processes in voice-operated system 1 as described above, in response to the user's instruction "Copy in 2-up format", a document placed on image forming device 100 is copied in 2-up format.

Figure 17:
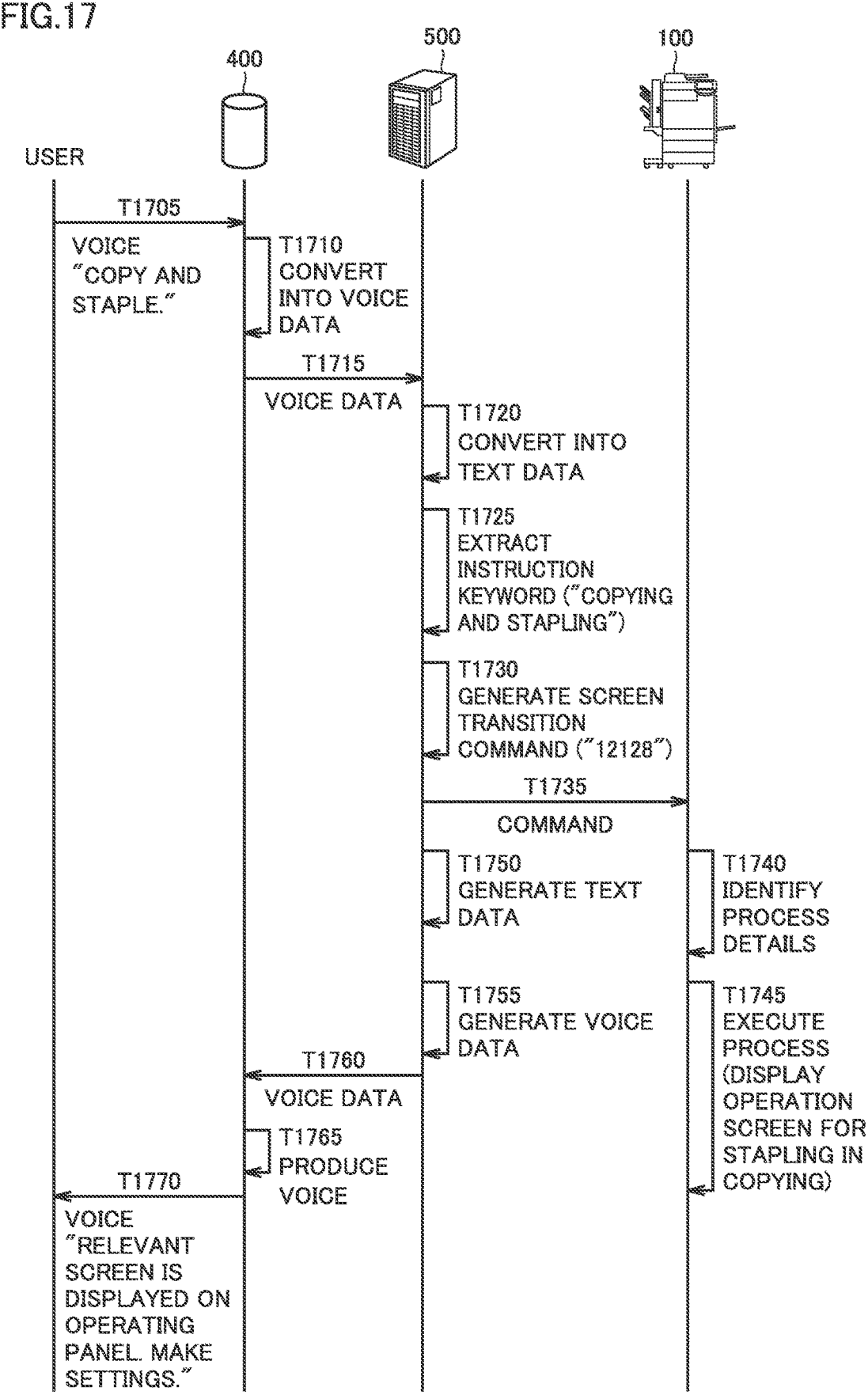
FIG. 17 is a sequence diagram for describing a series of processes at the voice-operated system performed when an instruction keyword is not included in table B but is included in table A.

FIG. 17 is a sequence diagram for describing a series of processes in voice-operated system 1 performed when an instruction keyword is not included in table B but is included in table A.

When the user utters "Copy and staple" (T1705), smart speaker 400 converts the voice into voice data (T1710), and transmits the voice data to server 500 (T1715).

Server 500 produces text from the voice data sent from smart speaker 400 (T1720), and extracts the instruction keyword "copying and stapling" (T1725). Server 500 generates a screen transition command that specifies the screen D "12128" by referring to table A (T1730). Server 500 transmits, to image forming device 100, the screen transition command that specifies the screen ID "12128" (T1735).

Image forming device 100 receives the command sent from server 500, identifies the process details indicated by the command (T1740), and ten executes a process in accordance with the identified process details (T1745). That is, image forming device 100 displays, on operating panel 40, a stapling operation screen among copying operation screens.

Server 500 transmits a screen transition command to image forming device 100, while transmitting voice data to smart speaker 400. Specifically, server 500 generates text data representing the message "The relevant screen is displayed on operating panel 40. Make settings." (T1750) Server 500 generates voice data corresponding to the text data (T1755), and transmits the voice data to smart speaker 400 (T1760).

Smart speaker 400 produces voice from the voice data sent from server 500 (T1765), and outputs the voice (T1770).

With a series of processes in voice-operated system 1 as described above, in response to the user's instruction "Copy and staple", a stapling operation screen, among copying operation screens, is displayed on operating panel 40.

Figure 18:
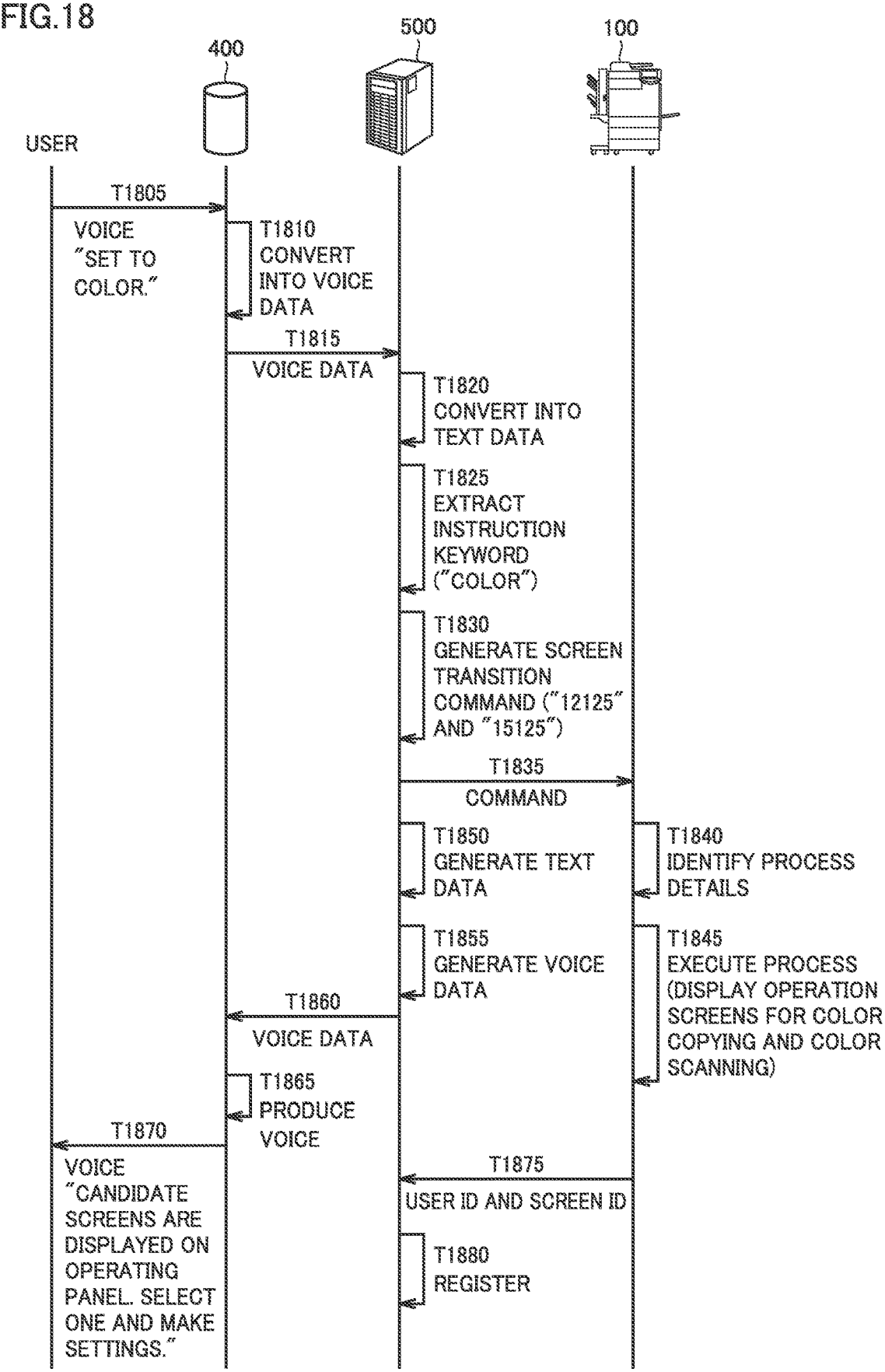
FIG. 18 is a sequence diagram for describing a series of processes at the voice-operated system performed when there are more than one target screen candidates corresponding to an instruction keyword.

FIG. 18 is a sequence diagram for describing a series of processes in voice-operated system 1 performed when there are more than one target screen candidates corresponding to an instruction keyword.

When the user utters "Set to color" (T1805), smart speaker 400 converts the voice into voice data (T1810), and transmits the voice data to server 500 (T1815).

Server 500 produces text from the voice data sent from smart speaker 400 (T1820), and extracts the instruction keyword "color" (T1825). Server 500 generates a screen transition command that specifies the screen ID "12125" and a screen transition command that specifies the screen ID "15125" by referring to table A (T1830). This is because it is not clear which the user intends to set "color copying" or "color scanning". Server 500 transmits, to image forming device 100, the screen transition command that specifies the screen ID "12125" and the screen transition command that specifies the screen ID "15125" (T1835).

Image forming device 100 receives the command sent from server 500, identifies the process details indicated by the command (T1840), and then executes a process in accordance with the identified process details (T1845). That is, image forming device 100 displays, on operating panel 40, a screen having the screen ID "12125" and a screen having the screen ID "15125". That is, image forming device 100 displays, on operating panel 40, a color copying operation screen and a color scanning operation screen.

Server 500 transmits a screen transition command to image forming device 100, while transmitting voice data to smart speaker 400. Specifically, server 500 generates text data representing the message "The candidate screens are displayed on operating panel 40. Select one and make settings." (T1850) Server 500 generates voice data corresponding to the text data (T1855), and transmits the voice data to smart speaker 400 (T1860).

Smart speaker 400 produces voice from the voice data sent from server 500 (T1865), and outputs the voice (T1870).

When the user selects a desired screen from among the candidate screens displayed on operating panel 40, image forming device 100 transmits, to server 500, the screen ID of the selected screen in association with the user ID logged in on image forming device 100 (T1875).

Server 500 stores, in association with one another in table Z in hard drive 530, the instruction keyword extracted at T1825, the user ID logged in on image forming device 100 sent from image forming device 100, and the screen ID sent from image forming device 100 (T1880).

With a series of processes in voice-operated system 1 as described above, in response to the user's instruction "Set to color", candidate screens are displayed on operating panel 40. The user can then select a desired screen from among the candidate screens and make settings. Next time the same user utters the same instruction keyword, voice-operated system 1 can identify the operation screen to be displayed on operating panel 40.

Figure 19:
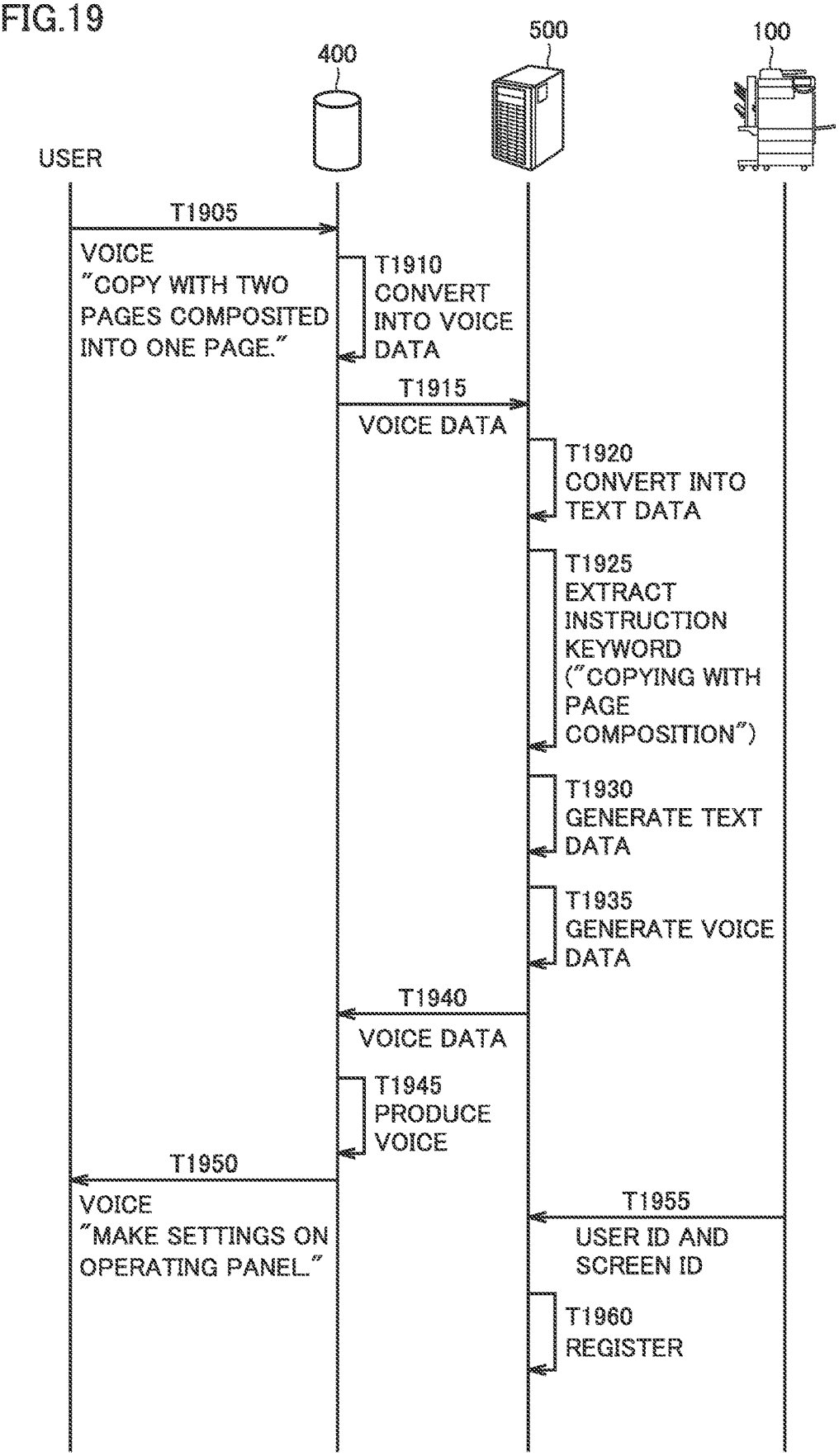
FIG. 19 is a sequence diagram for describing a series of processes at the voice-operated system performed when an instruction keyword is included in neither table A nor table B.

FIG. 19 is a sequence diagram for describing a series of processes in voice-operated system 1 performed when an instruction keyword is included in neither table A nor table B.

When the user utters "Copy with two pages composited into one page" (T1905), smart speaker 400 converts the voice into voice data (T1910), and transmits the voice data to server 500 (T1915).

Server 500 produces text from the voice data sent from smart speaker 400 (T1920), and extracts the instruction keyword "copying with page composition" (T1925). Since the instruction keyword "copying with page composition" is included in neither table A nor table B, server 500, without generating a command, generates text data representing the message "Make settings on operating panel 40." (T1930) Server 500 generates voice data corresponding to the text data (T1935), and transmits the voice data to smart speaker 400 (T1940).

Smart speaker 400 produces voice from the voice data sent from server 500 (T1945), and outputs the voice (T1950).

When the user performs a setting operation on operating panel 40, image forming device 100 transmits, to server 500, the screen ID of the operation screen operated by the user and the user ID logged in on image forming device 100, in association with each other (T1955).

Server 500 stores, in association with one another in table Z in hard drive 530, the instruction keyword extracted at T1925, the user ID logged in on image forming device 100 sent from image forming device 100, and the screen ID sent from image forming device 100 (T1960).

With a series of processes in voice-operated system 1 as described above, in response to the user's instruction "Copy with two pages composited into one page", a voice is output that prompts the user to make settings on operating panel 40. Further, next time the same user utters the same instruction keyword, voice-operated system 1 can identify the operation screen to be displayed on operating panel 40, since table Z stores, in association with one another, the screen ID of the operation screen operated by the user, the user ID, and the instruction keyword.

Thus, in embodiment 1, it is only for frequently used processes that voice-operated system 1 provides execution commands for voice-based execution. For other processes, voice-operated system 1 merely provides screen transition commands. This can reduce the number of execution commands to be developed, thus reducing the man-hour for development.

When the user's voice instruction is an execution instruction for a process with no execution command available, voice-operated system 1 displays a screen related to the user's instruction on operating panel 40. Specifically, if there is one screen corresponding to an instruction keyword, voice-operated system 1 displays the screen on operating panel 40. If there are a plurality of candidate screens corresponding to an instruction keyword, voice-operated system 1 displays the candidate screens on operating panel 40 to allow the user to select a desired screen. If there are a plurality of instruction keywords, voice-operated system 1 displays, on operating panel 40, a higher-level screen common to the screens corresponding to the respective instruction keywords. Thus, even when the user's voice instruction is an execution instruction for a process with no execution command available, the user's operability is not compromised.

When the user's voice instruction is an execution instruction for a process with neither execution command nor screen transition command available, or when there are a plurality of target screen candidates and the user selects a desired screen from among the candidates, voice-operated system 1 stores, in association with one another in table Z in hard drive 530, an instruction keyword, the user ID logged in on image forming device 100, and the screen ID. Thus, next time the same user utters the same instruction keyword, voice-operated system 1 can identify the operation screen to be displayed on operating panel 40.

In voice-operated system 1, part or all of the processes at server 500 may be provided as a cloud service.

The program to be executed by CPU 411 may be stored in a hard drive included in smart speaker 400, or may be stored in a storage medium attachable to and removable from smart speaker 400, instead of being stored in ROM 413 as described above. Examples of the storage medium having stored thereon the program include a medium that stores data in a nonvolatile manner, such as a compact disk read only memory (CD-ROM), a digital versatile disc read only memory (DVD-ROM), a universal serial bus (USB) memory, a memory card, a floppy disk (FD), a hard drive, a solid state drive (SSD), a magnetic tape, a cassette tape, a magneto optical disc (MO), a mini disc (MD), an integrated circuit (IC) card (except memory card), an optical card, a mask read only memory (ROM), an erasable programmable read only memory (EPROM), and an electrically erasable programmable read only memory (EEPROM).

The program to be executed by CPU 511 may be stored in hard drive 530, or may be stored in a storage medium attachable to and removable from server 500, instead of being stored in ROM 513 as described above. Examples of the storage medium having stored thereon the program include a medium that stores data in a nonvolatile manner, such as a CD-ROM, a DVD-ROM, a USB memory, a memory card, an FD, a hard drive, an SSD, a magnetic tape, a cassette tape, an MO, an MD, an IC card (except memory card), an optical card, a mask ROM, an EPROM, and an EEPROM.

The program to be executed by CPU 71 may be stored in hard drive 80, or may be stored in a storage medium attachable to and removable from image forming device 100, instead of being stored in ROM 73 as described above. Examples of the storage medium having stored thereon the program include a medium that stores data in a nonvolatile manner, such as a CD-ROM, a DVD-ROM, a USB memory, a memory card, an FD, a hard drive, an SSD, a magnetic tape, a cassette tape, an MO, an MD, an IC card (except memory card), an optical card, a mask ROM, an EPROM, and an EEPROM.

Embodiment 2

Embodiment 2 will now be described. In embodiment 1, when an extracted instruction keyword is included in table B, voice-operated system 1 generates an execution command corresponding to the instruction keyword. By contrast, in embodiment 2, even when an extracted instruction keyword is included in table B, the voice-operated system generates a screen transition command without generating an execution command when the process instructed by the user's voice is a specific process. In the following, only the differences from embodiment 1 are described. The parts similar to those of embodiment 1 are designated by the same reference signs, and the description of such parts is not repeated.

The specific process is a process for which the execution instruction itself is likely to be an error. Examples of the specific processes include: a process instructed to be executed on an operation screen at a deep hierarchy level; a process for which the number of executions is equal to or less than a predetermined number; and a process for which the number of stops is equal to or more than a predetermined number. A process instructed to be executed on an operation screen at a deep hierarchy level tends to be less frequently used by the user. Hence, for such a process, the execution instruction itself is likely to be an error. Also, an item for which the number of executions is equal to or less than a predetermined number, and an item for which the number of stops is equal to or more than a predetermined number tend to be less frequently used by the user. Hence, for such processes, the execution instruction itself is likely to be an error. Accordingly, when the process instructed by the user's voice is a specific process, voice-operated system 1 in embodiment 2 merely generates a screen transition command for screen transition, rather than generating an execution command for the execution of a process.

Figure 21:
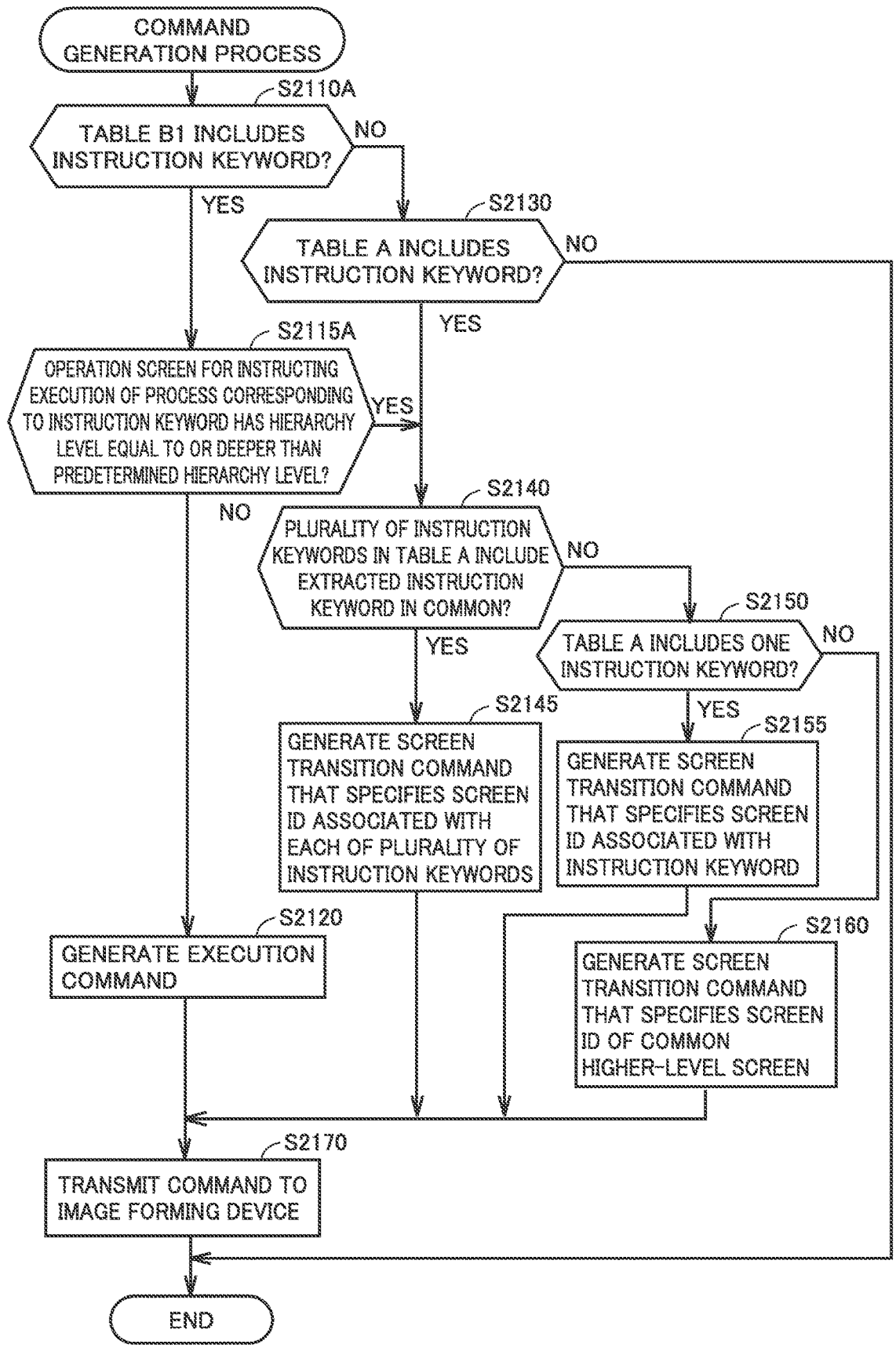
FIG. 21 is a flowchart showing a command generation process in embodiment 2.

With reference to FIGS. 20 and 21, a case will now be described in which the specific process is a process instructed to be executed on an operation screen at a deep hierarchy level.

FIG. 20 shows a data structure of a table B1 in embodiment 2. Table B1 is stored in hard drive 530 and referred to in the process performed by command generator 5103. Table B1 associates instruction keywords, execution commands, and screen hierarchy levels with one another. Each screen hierarchy level is the hierarchy level of an operation screen for instructing the execution of the process corresponding to an instruction keyword. The higher the numerical value of the "screen hierarchy level" field, the deeper the hierarchy level of the screen. Items displayed on screens at a deeper hierarchy level tend to be less frequently used.

FIG. 21 is a flowchart showing a command generation process in embodiment 2. The process shown in FIG. 21 is implemented by CPU 511 executing a predetermined program stored in ROM 513.

First, control unit 510 determines whether or not the instruction keyword extracted at step S830 is included in table B1 (step S2110A). When the instruction keyword extracted at step S830 is included in table B1 (YES at step S2110A), control unit 510 proceeds to step S2115A. On the other hand, when the instruction keyword extracted at step S830 is not included in table B1 (NO at step S2110A), control unit 510 proceeds to step S2130.

At step S2115A, control unit 510 determines whether or not the operation screen for instructing the execution of the process corresponding to the instruction keyword has a hierarchy level equal to or deeper than a predetermined hierarchy level. When the operation screen for instructing the execution of the process corresponding to the instruction keyword has a hierarchy level equal to or deeper than a predetermined hierarchy level (YES at step S2115A), control unit 510 proceeds to step S2140. On the other hand, when the operation screen for instructing the execution of the process corresponding to the instruction keyword has a hierarchy level less deep than a predetermined hierarchy level (NO at step S2115A), control unit 510 proceeds to step S2120.

At step S2120, control unit 510 generates an execution command corresponding to the instruction keyword by referring to table B1.

At step S2130, control unit 510 determines whether or not the instruction keyword extracted at step S830 is included in table A. When the instruction keyword extracted at step S830 is included in table A (YES at step S2130), control unit 510 proceeds to step S2140. On the other hand, when the instruction keyword extracted at step S830 is not included in table A (NO at step S2130), control unit 510 ends a series of processes shown in FIG. 21.

At step S2140, control unit 510 determines whether or not the instruction keyword extracted at step S830 is included in a plurality of instruction keywords in table A in common. For example, when the instruction keyword extracted at step S830 is "color", "color" is included in "color copying" and "color scanning". Thus, control unit 510 determines that the instruction keyword extracted at step S830 is included in a plurality of instruction keywords in table A in common. When the instruction keyword extracted at step S830 is included in a plurality of instruction keywords in table A in common (YES at step S2140), control unit 510 proceeds to step S2145. On the other hand, when the instruction keyword extracted at step S830 is not included in a plurality of instruction keywords in table A in common (NO at step S2140), control unit 510 proceeds to step S2150.

At step S2145, control unit 510 generates a screen transition command that specifies the screen ID associated with each of the plurality of instruction keywords that include the instruction keyword extracted at step S830 in common, among the instruction keywords included in table A. For example, when the instruction keyword is "color", control unit 510 generates a screen transition command that specifies the screen ID "12125" and a screen transition command that specifies the screen ID "15125". If, in table Z, the instruction keyword extracted at step S830 has already been associated with a screen ID of operation screen that has ever been operated by the user, then at step S2145, control unit 510 may generate only a screen transition command that specifies the screen ID.

At step S2150, control unit 510 determines whether or not the number of instruction keywords extracted at step S830 and included in table A is one. When the number of instruction keywords extracted at step S830 and included in table A is one (YES at step S2150), control unit 510 proceeds to step S2155. On the other hand, when the number of instruction keywords extracted at step S830 and included in table A is more than one (NO at step S2150), control unit 510 proceeds to step S2160.

At step S2155, control unit 510 generates a screen transition command that specifies the screen ID associated with the instruction keyword extracted at step S830 in table A. For example, when the instruction keyword is "copying and stapling", control unit 510 generates a screen transition command that specifies the screen ID "12128".

At step S2160, control unit 510 generates a screen transition command that specifies a common screen ID, among the screen IDs of higher-level screens associated with each of the instruction keywords extracted at step S830 in table A. If there are a plurality of common screen IDs, control unit 510 generates a screen transition command that specifies the lowest-hierarchy-level screen ID, among the plurality of common screen IDs. For example, when the instruction keywords are "color copying" and "copying and stapling", control unit 510 generates a screen transition command that specifies the screen ID "12100".

After step S2120, step S2145, step S2155, or step S2160, control unit 510 proceeds to step S2170. At step S2170, control unit 510 transmits the execution command or screen transition command to image forming device 100 via communication interface 520. After step S2170, control unit 510 ends a series of processes shown in FIG. 21.

Figure 23:
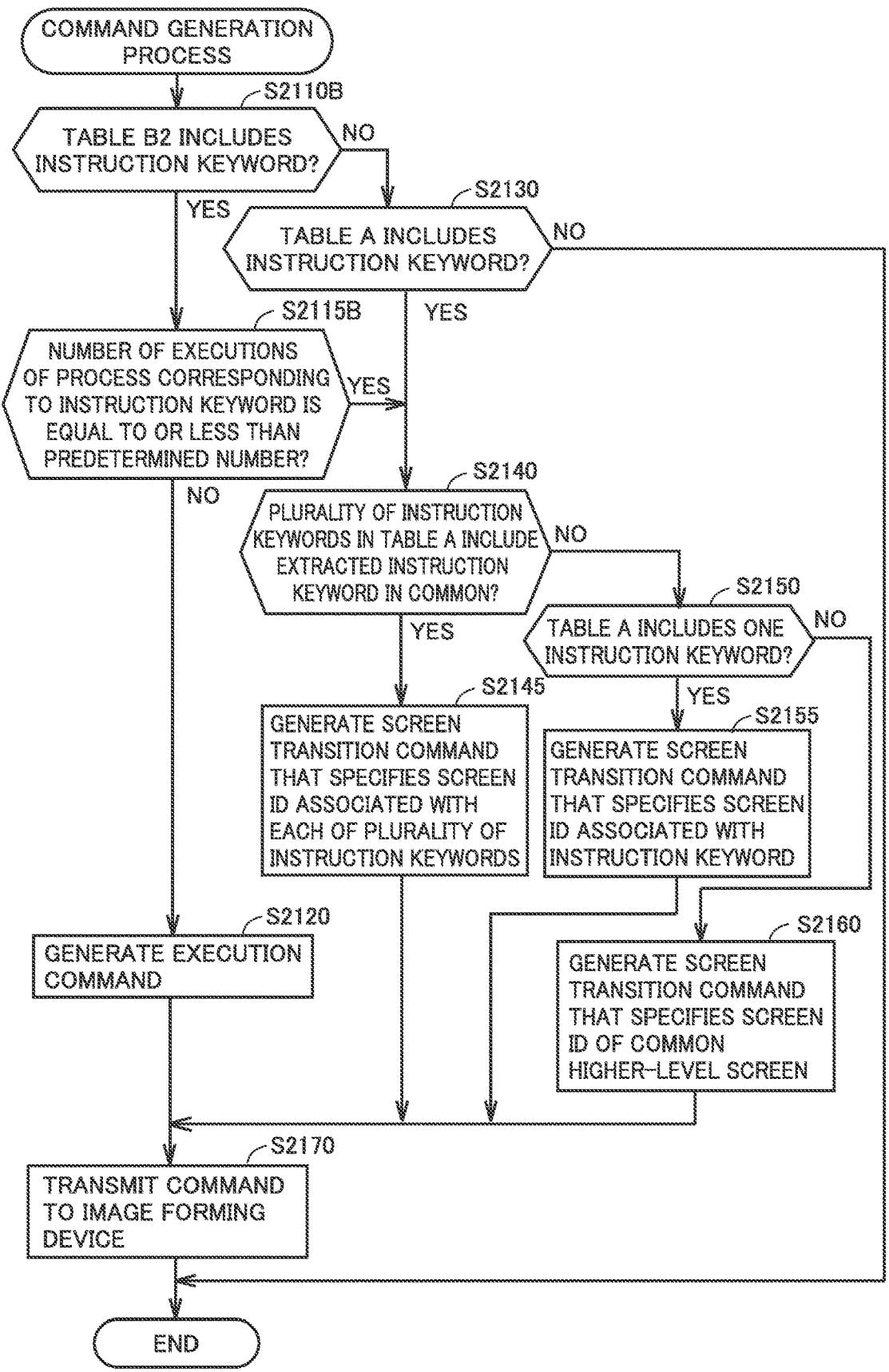
FIG. 23 is a flowchart showing a command generation process in embodiment 2.

With reference to FIGS. 22 and 23, a case will now be described in which the specific process is a process for which the number of executions is equal to or less than a predetermined number.

FIG. 22 shows a data structure of a table B2 in embodiment 2. Table B2 is stored in hard drive 530 and referred to in the process performed by command generator 5103. Table B2 associates instruction keywords, execution commands, and the numbers of executions with one another. Each number of executions is the number of times the process corresponding to an instruction keyword has been executed.

FIG. 23 is a flowchart showing a command generation process in embodiment 2. The process shown in FIG. 23 is implemented by CPU 511 executing a predetermined program stored in ROM 513. The process shown in FIG. 23 is different from the process shown in FIG. 21 in step S2110B and step S2115B.

At step S2110B, control unit 510 determines whether or not the instruction keyword extracted at step S830 is included in table B2. When the instruction keyword extracted at step S830 is included in table B2 (YES at step S2110B), control unit 510 proceeds to step S2115B. On the other hand, when the instruction keyword extracted at step S830 is not included in table B2 (NO at step S2110B), control unit 510 proceeds to step S2130.

At step S2115B, control unit 510 determines whether or not the number of executions of the process corresponding to the instruction keyword is equal to or less than a predetermined number. When the number of executions of the process corresponding to the instruction keyword is equal to or less than a predetermined number (YES at step S2115B), control unit 510 proceeds to step S2140. On the other hand, when the number of executions of the process corresponding to the instruction keyword is more than a predetermined number (NO at step S2115B), control unit 510 proceeds to step S2120.

The processes in FIG. 23 except steps S2110B and S2115B are the same as those of FIG. 21, and thus the description thereof is not repeated. Step S2120 is deemed to be replaced with "control unit 510 generates an execution command corresponding to the instruction keyword by referring to table B2".

Figure 25:
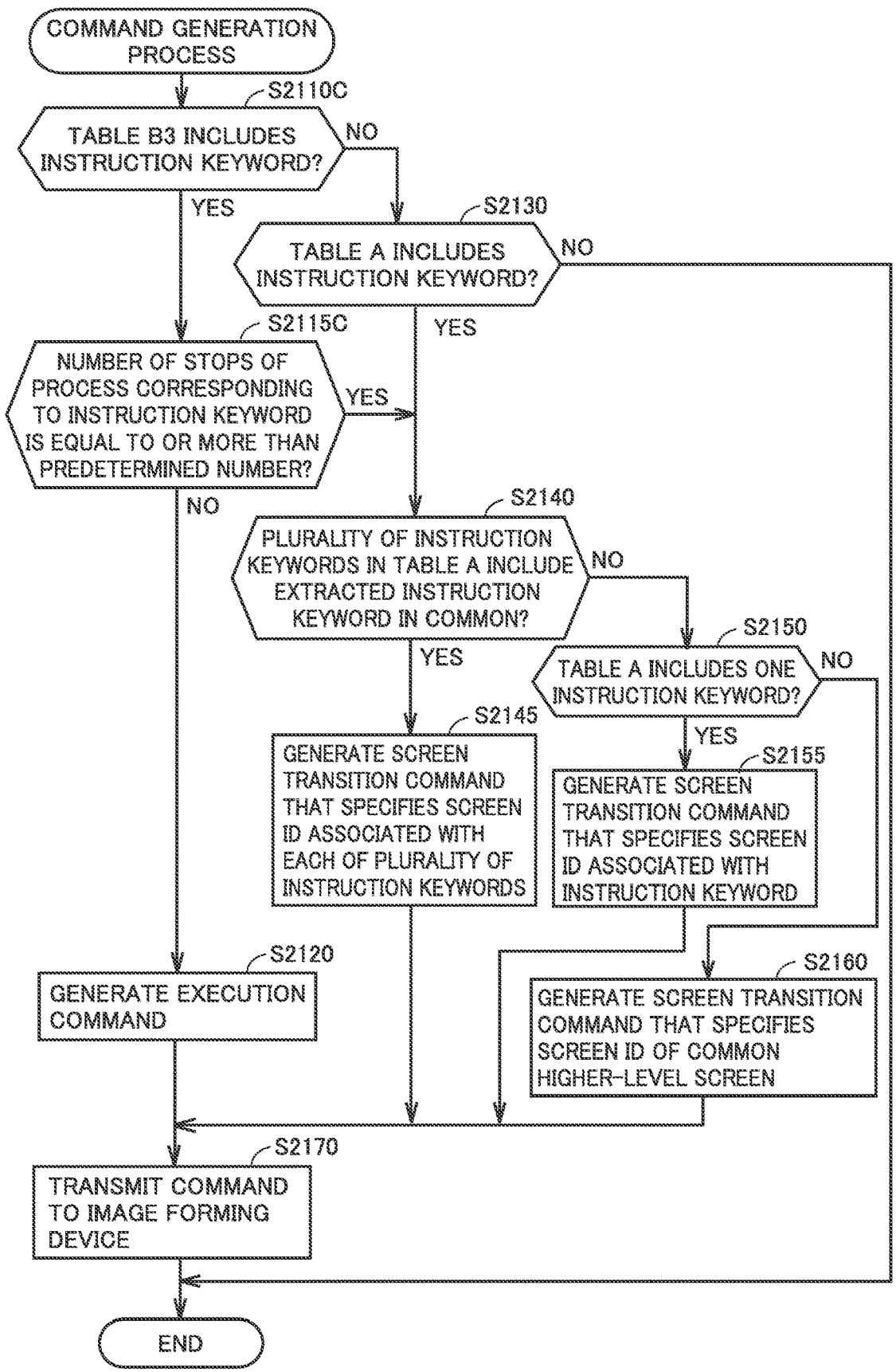
FIG. 25 is a flowchart showing a command generation process in embodiment 2.

With reference to FIGS. 24 and 25, a case will now be described in which the specific process is a process for which the number of stops is equal to or more than a predetermined number.

FIG. 24 shows a data structure of a table B3 in embodiment 2. Table B3 is stored in hard drive 530 and referred to in the process performed by command generator 5103. Table B3 associates instruction keywords, execution commands, and the numbers of stops with one another. Each number of stops is the number of times the process corresponding to an instruction keyword has been stopped.

FIG. 25 is a flowchart showing a command generation process in embodiment 2. The process shown in FIG. 25 is implemented by CPU 511 executing a predetermined program stored in ROM 513. The process shown in FIG. 25 is different from the process shown in FIG. 21 in steps S2110C and 52115C.

At step S2110C, control unit 510 determines whether or not the instruction keyword extracted at step S830 is included in table B3. When the instruction keyword extracted at step S830 is included in table B3 (YES at step S2110C), control unit 510 proceeds to step S2115C. On the other hand, when the instruction keyword extracted at step S830 is not included in table B3 (NO at step S2110C), control unit 510 proceeds to step S2130.

At step S2115C, control unit 510 determines whether or not the number of stops of the process corresponding to the instruction keyword is equal to or more than a predetermined number. When the number of stops of the process corresponding to the instruction keyword is equal to or more than a predetermined number (YES at step S2115C), control unit 510 proceeds to step S2140. On the other hand, when the number of stops of the process corresponding to the instruction keyword is less than a predetermined number (NO at step S2115C), control unit 510 proceeds to step S2120.

The processes in FIG. 25 except steps S2110C and 52115C are the same as those of FIG. 21, and thus the description thereof is not repeated. Step S2120 is deemed to be replaced with "control unit 510 generates an execution command corresponding to the instruction keyword by referring to table B3".

Thus, in embodiment 2, when receiving an execution instruction for a process for which the execution instruction itself is likely to be an error, voice-operated system 1 generates a screen transition command, rather than an execution command. In this case, only screen transition is performed, with no execution of a process. This can prevent erroneous processes from being executed.

Embodiment 3

Embodiment 3 will now be described. In embodiment 1, voice-operated system 1 includes only one table A that associates instruction keywords with screen IDs of operation screens, and only one table B that associates instruction keywords with execution commands By contrast, in embodiment 3, the voice-operated system includes a table that associates instruction keywords with screen IDs of operation screens, and a table that associates instruction keywords with execution commands, for each model of the image forming device or for each version of application included in the image forming device. In the following, only the differences from embodiment 1 are described. The parts similar to those of embodiment 1 are designated by the same reference signs, and the description of such parts is not repeated.

Figure 27:
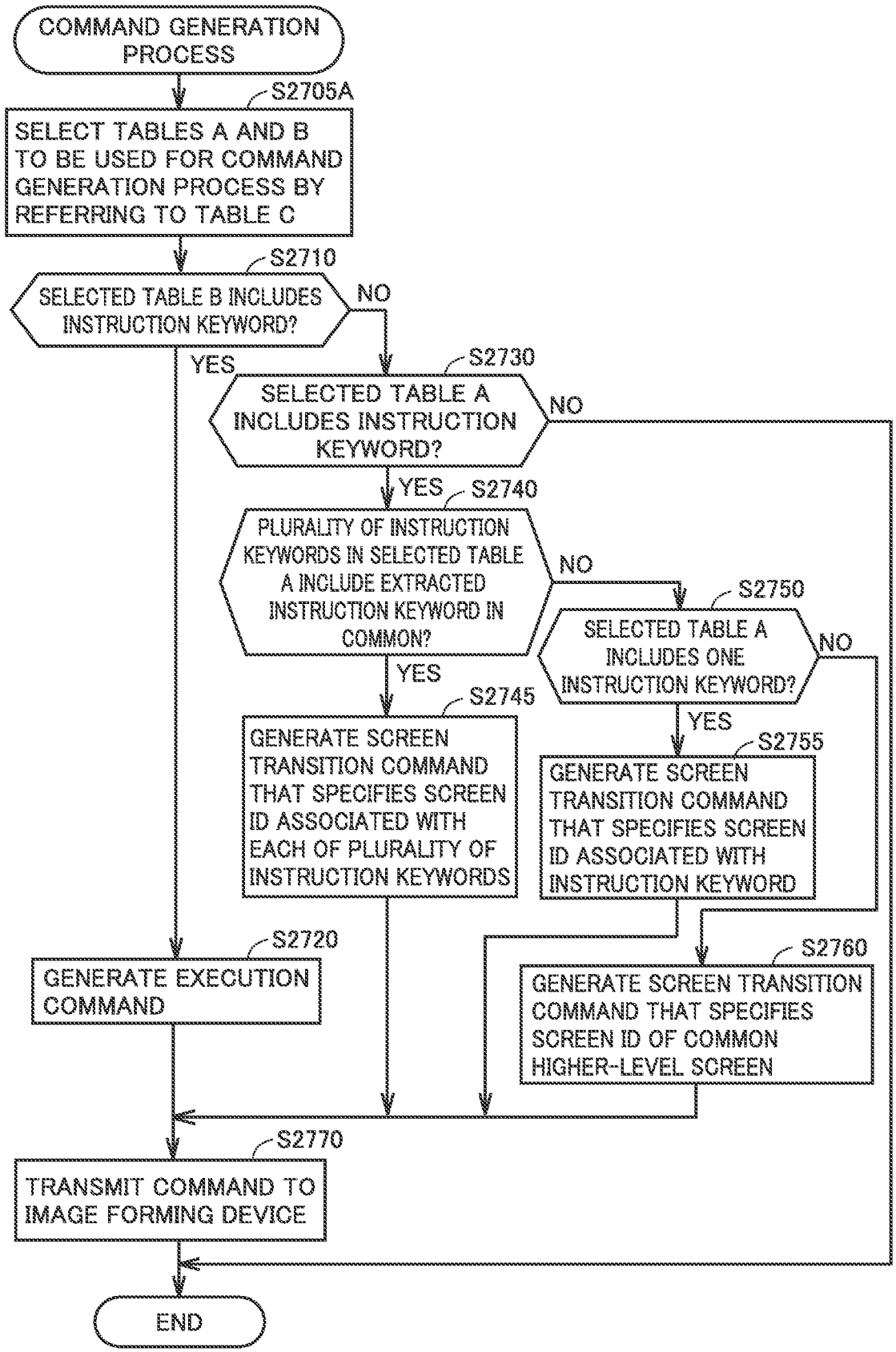
FIG. 27 is a flowchart showing a command generation process in embodiment 3.

With reference to FIGS. 26 and 27, a case will now be described in which voice-operated system 1 includes table A that associates instruction keywords with screen IDs of operation screens and table B that associates instruction keywords with execution commands, for each model of image forming device 100.

FIG. 26 shows a data structure of a table C in embodiment 3. Table C is stored in hard drive 530 and referred to in the process performed by command generator 5103.

Table C associates the installation locations of image forming devices 100, the model names of image forming devices 100, the names of tables A, and the names of tables B with one another. The field of "installation location" contains the installation locations of image forming devices 100. The field of "model name" contains the model names of image forming devices 100. The field of "table A" contains the names of tables corresponding to the model names of image forming devices 100, among the tables that associate instruction keywords with screen IDs of operation screens. The field of "table B" contains the names of tables corresponding to the model names of image forming devices 100, among the tables that associate instruction keywords with execution commands Tables Aa, Ab, and Ac have the same data structure as table A. Tables Ba, Bb, and Bc have the same data structure as table B.

When the user utters, to smart speaker 400, an instruction for image forming device 100 after specifying an installation location or model name of image forming device 100, control unit 510 selects, by referring to table C, tables A and B corresponding to the specified installation location or model name. Control unit 510 generates a command by referring to the selected tables. The user may use voice or operating panel 40 to specify an installation location or model name of image forming device 100.

FIG. 27 is a flowchart showing a command generation process in embodiment 3. The process shown in FIG. 27 is implemented by CPU 511 executing a predetermined program stored in ROM 513.

First, control unit 510 selects tables A and B to be used for a command generation process, by referring to table C (step S2705A).

Then, control unit 510 determines whether or not the instruction keyword extracted at step S830 is included in table B selected at step S2705A (step S2710). When the instruction keyword extracted at step S830 is included in table B selected at step S2705A (YES at step S2710), control unit 510 proceeds to step S2720. On the other hand, when the instruction keyword extracted at step S830 is not included in table B selected at step S2705A (NO at step S2710), control unit 510 proceeds to step S2730.

At step S2720, control unit 510 generates an execution command corresponding to the instruction keyword by referring to table B selected at step S2705A.

At step S2730, control unit 510 determines whether or not the instruction keyword extracted at step S830 is included in table A selected at step S2705A. When the instruction keyword extracted at step S830 is included in table A selected at step S2705A (YES at step S2730), control unit 510 proceeds to step S2740. When the instruction keyword extracted at step S830 is not included in table A selected at step S2705A (NO at step S2730), control unit 510 ends a series of processes shown in FIG. 27.

At step S2740, control unit 510 determines whether or not the instruction keyword extracted at step S830 is included in a plurality of instruction keywords in table A selected at step S2705A in common. For example, when the instruction keyword extracted at step S830 is "color", "color" is included in "color copying" and "color scanning". Thus, control unit 510 determines that the instruction keyword extracted at step S830 is included in a plurality of instruction keywords in table A in common. When the instruction keyword extracted at step S830 is included in a plurality of instruction keywords in table A selected at step S2705A in common (YES at step S2740), control unit 510 proceeds to step S2745. On the other hand, when the instruction keyword extracted at step S830 is not included in a plurality of instruction keywords in table A selected at step S2705A in common (NO at step S2740), control unit 510 proceeds to step S2750.

At step S2745, control unit 510 generates a screen transition command that specifies the screen ID associated with each of the plurality of instruction keywords that include the instruction keyword extracted at step S830 in common, among the instruction keywords included in table A selected at step S2705A. For example, when the instruction keyword is "color", control unit 510 generates a screen transition command that specifies the screen ID "12125" and a screen transition command that specifies the screen ID "15125". If, in table Z, the instruction keyword extracted at step S830 has already been associated with a screen ID of operation screen that has ever been operated by the user, then at step S2745, control unit 510 may generate only a screen transition command that specifies the screen ID.

At step S2750, control unit 510 determines whether or not the number of instruction keywords extracted at step S830 and included in table A selected at step S2705A is one. When the number of instruction keywords extracted at step S830 and included in table A selected at step S2705A is one (YES at step S2750), control unit 510 proceeds to step S2755. On the other hand, when the number of instruction keywords extracted at step S830 and included in table A selected at step S2705A is more than one (NO at step S2750), control unit 510 proceeds to step S2760.

At step S2755, control unit 510 generates a screen transition command that specifies the screen ID associated with the instruction keyword extracted at step S830 in table A selected at step S2705A. For example, when the instruction keyword is "copying and stapling", control unit 510 generates a screen transition command that specifies the screen ID "12128".

At step S2760, control unit 510 generates a screen transition command that specifies a common screen ID, among the screen IDs of higher-level screens associated with each of the instruction keywords extracted at step S830 in table A selected at step S2705A. If there are a plurality of common screen IDs, control unit 510 generates a screen transition command that specifies the lowest-hierarchy-level screen ID, among the plurality of common screen IDs. For example, when the instruction keywords are "color copying" and "copying and stapling", control unit 510 generates a screen transition command that specifies the screen ID "12100".

After step S2720, step S2745, step S2755, or step S2760, control unit 510 proceeds to step S2770. At step S2770, control unit 510 transmits the execution command or screen transition command to image forming device 100 via communication interface 520. After step S2770, control unit 510 ends a series of processes shown in FIG. 27.

Figure 29:
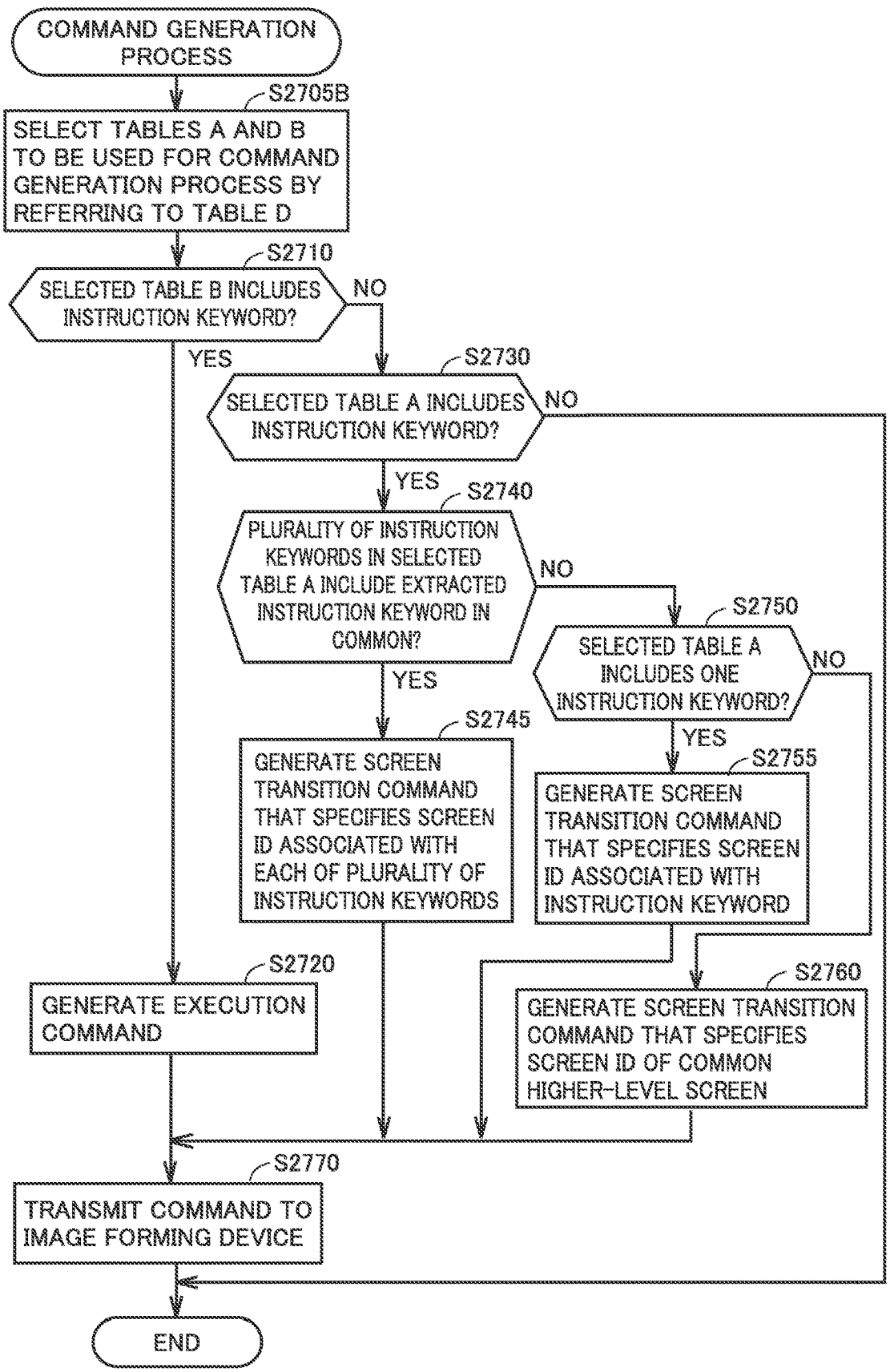
FIG. 29 is a flowchart showing a command generation process in embodiment 3.

With reference to FIGS. 28 and 29, a case will now be described in which voice-operated system 1 includes table A that associates instruction keywords with screen IDs of operation screens and table B that associates instruction keywords with execution commands, for each version of application included in image forming device 100.

FIG. 28 shows a data structure of a table D in embodiment 3. Table D is stored in hard drive 530 and referred to in the process performed by command generator 5103.

Table D associates the installation locations of image forming devices 100, the versions of applications included in image forming devices 100, the names of tables A, and the names of tables B with one another. The field of "installation location" contains the installation locations of image forming devices 100. The field of "version" contains the versions of applications included in image forming devices 100. The field of "table A" contains the names of tables corresponding to the versions of applications included in image forming devices 100, among the tables that associate instruction keywords with screen IDs of operation screens. The field of "table B" contains the names of tables corresponding to the versions of applications included in image forming devices 100, among the tables that associate instruction keywords with execution commands Tables A51, A62, and A71 have the same data structure as table A. Tables B51, B62, and B71 have the same data structure as table B.

When the user utters, to smart speaker 400, an instruction for image forming device 100 after specifying an installation location of image forming device 100 or a version of application included in image forming device 100, control unit 510 selects, by referring to table D, tables A and B corresponding to the specified installation location or the specified version of application included in image forming device 100. Control unit 510 generates a command by referring to the selected tables. The user may use voice or operating panel 40 to specify an installation location of image forming device 100 or a version of application included in image forming device 100.

FIG. 29 is a flowchart showing a command generation process in embodiment 3. The process shown in FIG. 29 is implemented by CPU 511 executing a predetermined program stored in ROM 513. The process shown in FIG. 29 is different from the process shown in FIG. 27 in step S2705B. At step S2705B, control unit 510 selects tables A and B to be used for a command generation process, by referring to table D.

The processes in FIG. 29 except step S2705B are the same as those of FIG. 27, and thus the description thereof is not repeated. Step S2710 is deemed to be replaced with "control unit 510 determines whether or not the instruction keyword extracted at step S830 is included in table B selected at step S2705B". Step S2720 is deemed to be replaced with "control unit 510 generates an execution command corresponding to the instruction keyword by referring to table B selected at step S2705B". Step S2730 is deemed to be replaced with "control unit 510 determines whether or not the instruction keyword extracted at step S830 is included in table A selected at step S2705B". Step S2740 is deemed to be replaced with "control unit 510 determines whether or not the instruction keyword extracted at step S830 is included in a plurality of instruction keywords in table A selected at step S2705B in common". Step S2745 is deemed to be replaced with "control unit 510 generates a screen transition command that specifies the screen ID associated with each of a plurality of instruction keywords that include the instruction keyword extracted at step S830 in common, among the instruction keywords included in table A selected at step S2705B". Step S2750 is deemed to be replaced with "control unit 510 determines whether or not the number of instruction keywords extracted at step S830 and included in table A selected at step S2705B is one". Step S2755 is deemed to be replaced with "control unit 510 generates a screen transition command that specifies the screen ID associated with the instruction keyword extracted at step S830 in table A selected at step S2705B". Step S2760 is deemed to be replaced with "control unit 510 generates a screen transition command that specifies a common screen ID, among the screen IDs of higher-level screens associated with each of the instruction keywords extracted at step S830 in table A selected at step S2705B".

Thus, in embodiment 3, voice-operated system 1 can generate a command corresponding to an instruction keyword, in accordance with the model of image forming device 100 or the version of application included in image forming device 100. In general, instruction keywords not compatible with voice-based operation in old-model image forming devices 100 or image forming devices 100 with old-version applications may be compatible with voice-based operation in new-model image forming devices 100 or image forming devices 100 with new-version applications, in some cases. In embodiment 3, the command generation process is performed in accordance with the model of image forming device 100 or the version of application included in image forming device 100, thus improving the user's operability.

Voice-operated system 1 may generate a command in accordance with both the model of image forming device 100 and the version of application included in image forming device 100.

Embodiment 4

Embodiment 4 will now be described. In embodiment 1, voice-operated system 1 includes smart speaker 400, server 500, and image forming device 100. By contrast, in embodiment 4, an image forming device alone can support voice-based operation. In the following, only the differences from embodiment 1 are described. The parts similar to those of embodiment 1 are designated by the same reference signs, and the description of such parts is not repeated.

Figure 30:
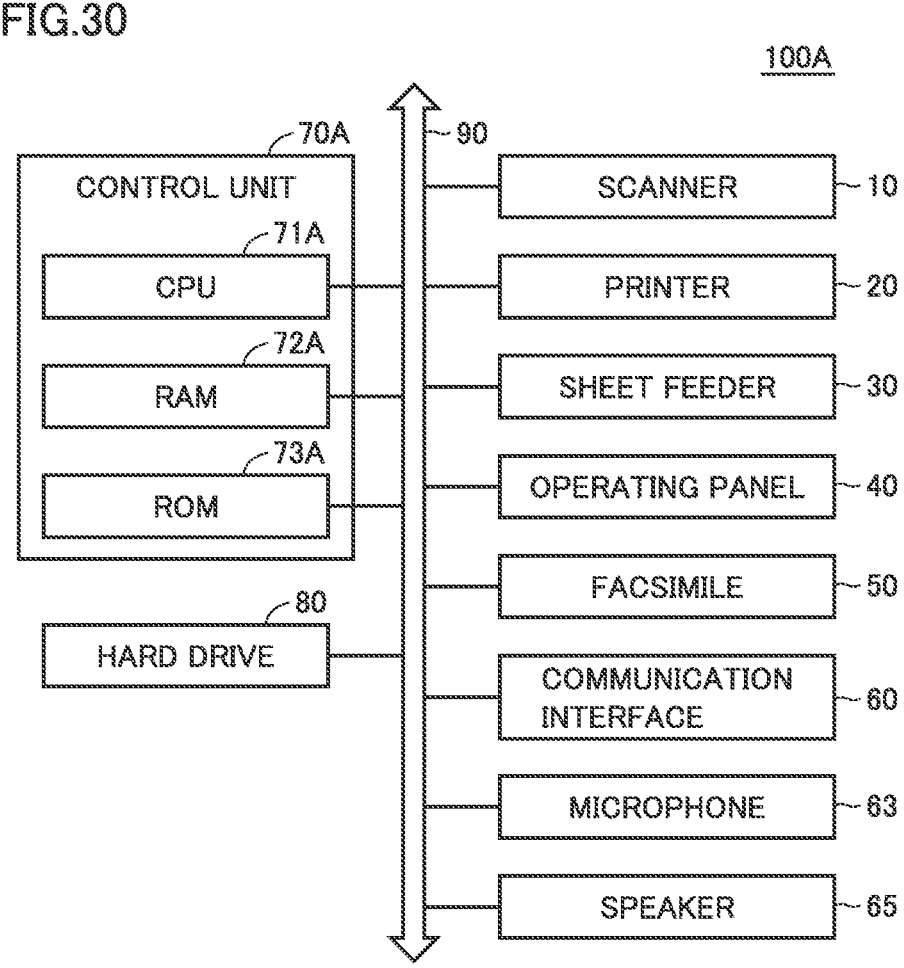
FIG. 30 is a block diagram showing a hardware configuration of an image forming device in embodiment 4.

FIG. 30 is a block diagram showing a hardware configuration of an image forming device 100A in embodiment 4. Image forming device 100A includes scanner 10, printer 20, sheet feeder 30, operating panel 40, facsimile 50, communication interface 60, a microphone 63, a speaker 65, a control unit 70A, and hard drive 80. Scanner 10, printer 20, sheet feeder 30, operating panel 40, facsimile 50, communication interface 60, microphone 63, speaker 65, control unit 70A, and hard drive 80 are connected through bus 90.

Microphone 63 receives an operation instruction for image forming device 100A by voice. Speaker 65 produces voice from voice data generated by control unit 70A and outputs the voice. Control unit 70A includes a CPU 71A, a RAM 72A, and a ROM 73A. CPU 71A generally controls the overall image forming device 100A by executing an operational program stored in, for example, ROM 73A. ROM 73A stores a program to be executed by CPU 71A and other data. RAM 72A, which serves as a workspace for CPU 71A to execute a program, temporarily stores the program and data for execution of the program.

FIG. 31 shows a functional configuration of image forming device 100A in embodiment 4. A voice receiver 701A, a voice recognizer 702A, an extracting unit 703A, a command generator 704A, an executing unit 705A, a text data generator 706A, a voice output unit 707A, and a registering unit 708A are implemented by CPU 71A executing predetermined programs stored in ROM 73A.

Voice receiver 701A receives an operation instruction for image forming device 100A by voice through microphone 63. Voice receiver 701A converts the received voice into voice data.

Voice recognizer 702A receives voice data from voice receiver 701A, and generates text data corresponding to the voice data. Voice recognizer 702A converts text data generated by text data generator 706A into voice data. Voice recognizer 702A may be substituted by a cloud service that provides the same or similar function.

Extracting unit 703A extracts an instruction keyword from the text data generated by voice recognizer 702A.

Command generator 704A generates a command corresponding to the instruction keyword extracted by extracting unit 703A, by referring to tables in hard drive 80. The process at command generator 704A is similar to the command generation process described in embodiment 1. In embodiment 4, table A that associates instruction keywords with screen IDs of operation screens and table B that associates instruction keywords with execution commands are stored in hard drive 80. In embodiment 4, step S970 in the command generation process is deemed to be replaced with "control unit 70A transmits the execution command or screen transition command to executing unit 705A".

Executing unit 705A executes a process based on the execution command or screen transition comman.

Text data generator 706A generates text data for voice to be output through speaker 65 when a screen transition command is generated by command generator 704A or when no command is generated by command generator 704A. The process for outputting voice through speaker 65 which is performed by text data generator 706A and voice recognizer 702A is similar to the process for instructing voice output described in embodiment 1. In embodiment 4, step S1080 in the process for instructing voice output is deemed to be replaced with "control unit 70A transmits the voice data to voice output unit 707A".

Voice output unit 707A produces voice from the voice data received from voice recognizer 702A, and outputs the voice through speaker 65.

Registering unit 708A stores, in association with one another in table Z in hard drive 80, an instruction keyword, the screen ID of an operation screen operated by the user, and the user ID logged in on image forming device 100A. Table Z, which is provided for each user, records the tendency (e.g., setting operations in the past) for each user. Registering unit 708A selects table Z of the user logged in on image forming device 100A, and stores, in association with each other in table Z, an instruction keyword and the screen ID of operation screen. The information stored in table Z is referred to for identifying the operation screen to be displayed on operating panel 40 next time the same user utters the same instruction keyword.

Thus, in embodiment 4, image forming device 100A alone can support voice-based operation. It is only for frequently used processes that image forming device 100A provides execution commands for voice-based execution. For other processes, image forming device 100A merely provides screen transition commands. This can reduce the number of execution commands to be developed, thus reducing the man-hour for development.

When the user's voice instruction is an execution instruction for a process with no execution command available, image forming device 100A displays a screen related to the user's instruction on operating panel 40. Specifically, if there is one screen corresponding to an instruction keyword, image forming device 100A displays the screen on operating panel 40. If there are a plurality of candidate screens corresponding to an instruction keyword, image forming device 100A displays the candidate screens on operating panel 40 to allow the user to select a desired screen. If there are a plurality of instruction keywords, image forming device 100A displays, on operating panel 40, a higher-level screen common to the screens corresponding to the respective instruction keywords. Thus, even when the user's voice instruction is an execution instruction for a process with no execution command available, the user's operability is not compromised.

When the user's voice instruction is an execution instruction for a process with neither execution command nor screen transition command available, or when there are a plurality of target screen candidates and the user selects a desired screen from among the candidates, image forming device 100A stores, in association with one another in table Z in hard drive 80, an instruction keyword, the user ID logged in on image forming device 100A, and the screen ID. Thus, next time the same user utters the same instruction keyword, image forming device 100A can identify the operation screen to be displayed on operating panel 40.

The program to be executed by CPU 71A may be stored in hard drive 80, or may be stored in a storage medium attachable to and removable from image forming device 100A, instead of being stored in ROM 73A as described above. Examples of the storage medium having stored thereon the program include a medium that stores data in a nonvolatile manner, such as a CD-ROM, a DVD-ROM, a USB memory, a memory card, an FD, a hard drive, an SSD, a magnetic tape, a cassette tape, an MO, an MD, an IC card (except memory card), an optical card, a mask ROM, an EPROM, and an EEPROM.

Embodiments have been described above. Embodiments 1 to 3 may be combined as needed. Embodiments 2 to 4 may also be combined as needed.

Although embodiments of the present invention have been described and illustrated in detail, the disclosed embodiments are made for purposes of illustration and example only and not limitation. The scope of the present invention should be interpreted by terms of the appended claims.

What is claimed is:

1. A voice-operated system comprising:
a processing device; and
a controller that communicates with the processing device,
the processing device including a first processor to perform:
displaying, on an operating panel, an operation screen for accepting an instruction from a user instructing a process to be executed by the processing device, and receiving an instruction from the user; and
executing a process corresponding to a command received from the controller, the controller including a second processor to perform:
generating the command for the processing device based on an input voice; and
transmitting the command to the processing device, wherein the generating of the command includes
determining whether the voice instructs the processing device to execute a first process or a second process;
when the voice instructs the processing device to execute the first process, generating a first command for instructing the operating panel to configure the operation screen to accept an instruction from the user to execute the first process, such that the first process is executed in accordance with the user inputting the instruction in the operation screen, and
when the voice instructs the processing device to execute the second process, generating a second command for instructing execution of the second process.

2. The voice-operated system according to claim 1, wherein
the controller further comprising a storage to store first data and second data,
the first data associating an instruction keyword with an identification number of the operation screen corresponding to the instruction keyword,
the second data associating a specific instruction keyword, among a plurality of the instruction keywords, with the second command for instructing execution of a process corresponding to the specific instruction keyword, and
the generating of the command includes
when the instruction keyword included in the voice is not included in the second data but is included in the first data, generating the first command by referring to the first data, and
when the instruction keyword included in the voice is included in the second data, generating the second command by referring to the second data.

3. The voice-operated system according to claim 2, wherein, when the instruction keyword included in the voice is included in neither the first data nor the second data, the controller prompts, on the operating panel, the user to instruct a process to be executed by the processing device.

4. The voice-operated system according to claim 3, wherein, when the process to be executed by the processing device is instructed on the operating panel, the controller stores, in association with one another, the instruction keyword included in the voice, the identification number of the operation screen operated by the user, and user information.

5. The voice-operated system according to claim 2, wherein
the first data further associates the instruction keyword with information on a higher-level screen located at a higher-level hierarchy relative to the operation screen corresponding to the instruction keyword, and
the generating of the command includes, when a plurality of instruction keywords are included in the voice, generating the first command for instructing the operating panel to display the higher-level screen common to the plurality of instruction keywords.

6. The voice-operated system according to claim 2, wherein, when there are a plurality of candidates for the operation screen corresponding to the instruction keyword included in the voice, the controller prompts the user to select one operation screen from among the candidates for the operation screen on the operating panel.

7. The voice-operated system according to claim 6, wherein, when the one operation screen is selected on the operating panel, the controller stores, in association with one another, the instruction keyword included in the voice, the identification number of the one operation screen, and user information.

8. The voice-operated system according to claim 2, wherein the generating of the command includes generating the first command by referring to the first data when the process corresponding to the instruction keyword is a specific process, even when the instruction keyword included in the voice is included in the second data.

9. The voice-operated system according to claim 8, wherein
the second data further associates the instruction keyword with information on a hierarchy level of the operation screen corresponding to the instruction keyword, and
the specific process is a process such that the hierarchy level of the operation screen for instructing execution of the specific process is equal to or deeper than a predetermined hierarchy level.

10. The voice-operated system according to claim 8, wherein
the second data further associates the instruction keyword with the number of executions of the process corresponding to the instruction keyword, and
the specific process is a process for which the number of executions is equal to or less than a predetermined number.

11. The voice-operated system according to claim 8, wherein
the second data further associates the instruction keyword with the number of stops of the process corresponding to the instruction keyword, and
the specific process is a process for which the number of stops is equal to or more than a predetermined number.

12. The voice-operated system according to claim 2, wherein
the storage stores the first data and the second data for each model of the processing device, and
the generating of the command includes
when the instruction keyword included in the voice is not included in the second data corresponding to a model of the processing device but is included in the first data corresponding to the model of the processing device, generating the first command by referring to the first data corresponding to the model of the processing device, and
when the instruction keyword included in the voice is included in the second data corresponding to the model of the processing device, generating the second command by referring to the second data corresponding to the model of the processing device.

13. The voice-operated system according to claim 2, wherein
the storage stores the first data and the second data for each version of application included in the processing device, and
the generating of the command includes
when the instruction keyword included in the voice is not included in the second data corresponding to a version of application but is included in the first data corresponding to the version of application, generating the first command by referring to the first data corresponding to the version of application, and
when the instruction keyword included in the voice is included in the second data corresponding to the version of application, generating the second command by referring to the second data corresponding to the version of application.

14. A controller that communicates with a processing device, the controller comprising a processor to perform:
generating a command for the processing device based on an input voice; and
transmitting the command to the processing device, wherein
the generating of the command includes:
determining whether the voice instructs the processing device to execute a first process or a second process;
when the voice instructs the processing device to execute the first process, generating a first command for instructing an operating panel of the processing device to configure an operation screen to accept an instruction from a user to execute the first process, such that the first process is executed in accordance with the user inputting the instruction in the operation screen, and
when the voice instructs the processing device to execute the second process, generating a second command for instructing execution of the second process.

15. A non-transitory computer-readable recording medium storing a control program to be executed by a computer that communicates with a processing device, the control program causing the computer to execute:
generating a command for the processing device based on an input voice; and
transmitting the command to the processing device, wherein
the generating of the command includes:
determining whether the voice instructs the processing device to execute a first process or a second process;
when the voice instructs the processing device to execute the first process, generating a first command for instructing an operating panel of the processing device to configure an operation screen to accept an instruction from a user to execute the first process, such that the first process is executed in accordance with the user inputting the instruction in the operation screen, and
when the voice instructs the processing device to execute the second process, generating a second command for instructing execution of the second process.

16. A processing device comprising a processor to perform:
receiving input of voice;
displaying an operation screen on an operating panel;
generating a command based on the input of voice; and
executing a process corresponding to the command, wherein
the generating of the command includes:
determining whether the voice instructs the processing device to execute a first process or a second process;
when the voice instructs the processing device to execute the first process, generating a first command for instructing the operating panel to configure the operation screen to accept an instruction from a user to execute the first process, such that the first process is executed in accordance with the user inputting the instruction in the operation screen, and
when the voice instructs the processing device to execute the second process, generating a second command for instructing execution of the second process.

* * * * *